(12) United States Patent
Ni et al.

(10) Patent No.: US 7,708,570 B2
(45) Date of Patent: May 4, 2010

(54) LIP STICK UNIVERSAL SERIAL BUS FLASH DRIVE WITH DEPLOYING AND RETRACTING FUNCTIONALITIES

(75) Inventors: Jim Chin-Nan Ni, San Jose, CA (US); Nan Nan, San Jose, CA (US); Charles Chung Lee, Cupertino, CA (US); David Nguyen, San Jose, CA (US)

(73) Assignee: SuperTalent Electronics, Inc., San Jose, CA (US)

( * ) Notice: Subject to any disclaimer, the term of this patent is extended or adjusted under 35 U.S.C. 154(b) by 52 days.

(21) Appl. No.: 11/770,657

(22) Filed: Jun. 28, 2007

(65) Prior Publication Data
US 2008/0160802 A1 Jul. 3, 2008

Related U.S. Application Data

(63) Continuation-in-part of application No. 11/309,594, filed on Aug. 28, 2006, now Pat. No. 7,383,362, which is a continuation-in-part of application No. 10/707,277, filed on Dec. 2, 2003, now Pat. No. 7,103,684, and a continuation-in-part of application No. 11/257,575, filed on Oct. 24, 2005, now Pat. No. 7,249,978.

(51) Int. Cl.
*H01R 13/44* (2006.01)

(52) U.S. Cl. ..................................................... 439/131
(58) Field of Classification Search .................. 439/131
See application file for complete search history.

(56) References Cited

U.S. PATENT DOCUMENTS

| 7,303,411 | B1 * | 12/2007 | Morganstern et al. ....... 439/131 |
| 7,407,393 | B2 | 8/2008 | Ni et al. |
| 7,420,803 | B2 | 9/2008 | Hsueh et al. |
| 2007/0171620 | A1 * | 7/2007 | Lee ............................ 361/737 |
| 2008/0160832 | A1 * | 7/2008 | Morganstern et al. ....... 439/625 |
| 2008/0232060 | A1 * | 9/2008 | Yu et al. ..................... 361/684 |
| 2008/0261450 | A1 * | 10/2008 | Nguyen et al. .............. 439/607 |

* cited by examiner

*Primary Examiner*—Gary F. Paumen
(74) *Attorney, Agent, or Firm*—Maryam Imam; IPxLaw Group LLP

(57) ABSTRACT

In one embodiment of the present invention, a universal serial bus (USB) flash drive rotary device is disclosed to include a plastic frame including a USB flash drive and a USB plug connector and a rotary tube at least partially enclosing said plastic frame for deploying said USB plug connector, the USB flash drive is coupled to the USB plug connector, the rotary tube is turned to retract said USB plug connector, the USB flash drive rotary device is for deploying the USB plug connector to couple the USB flash drive to a USB port.

13 Claims, 30 Drawing Sheets

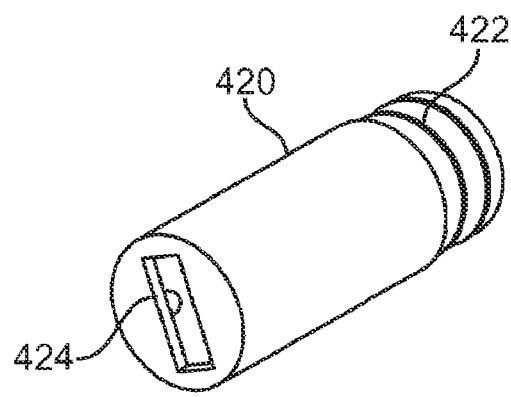 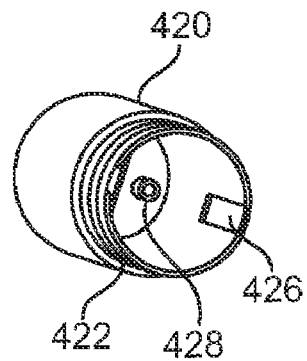
FIG. 24(a)          FIG. 24(b)
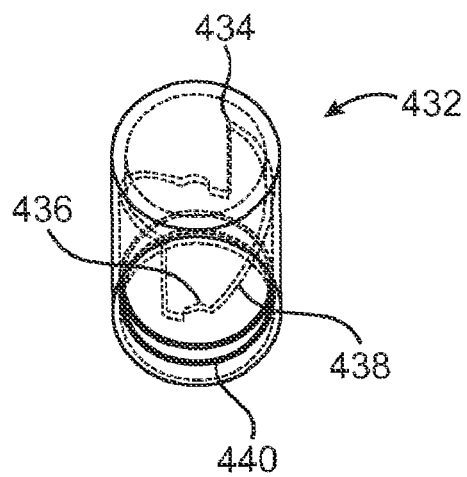
FIG. 25

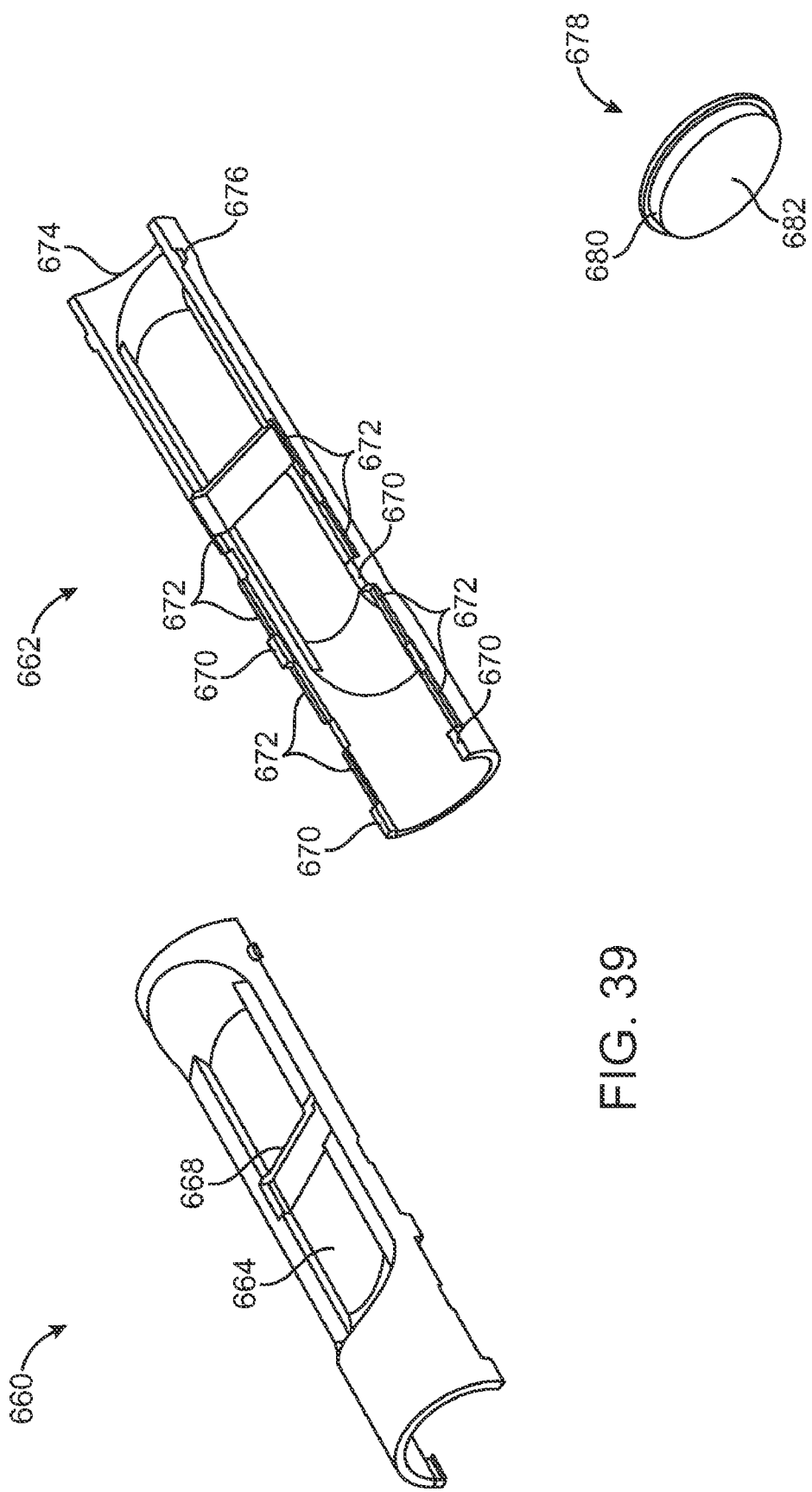

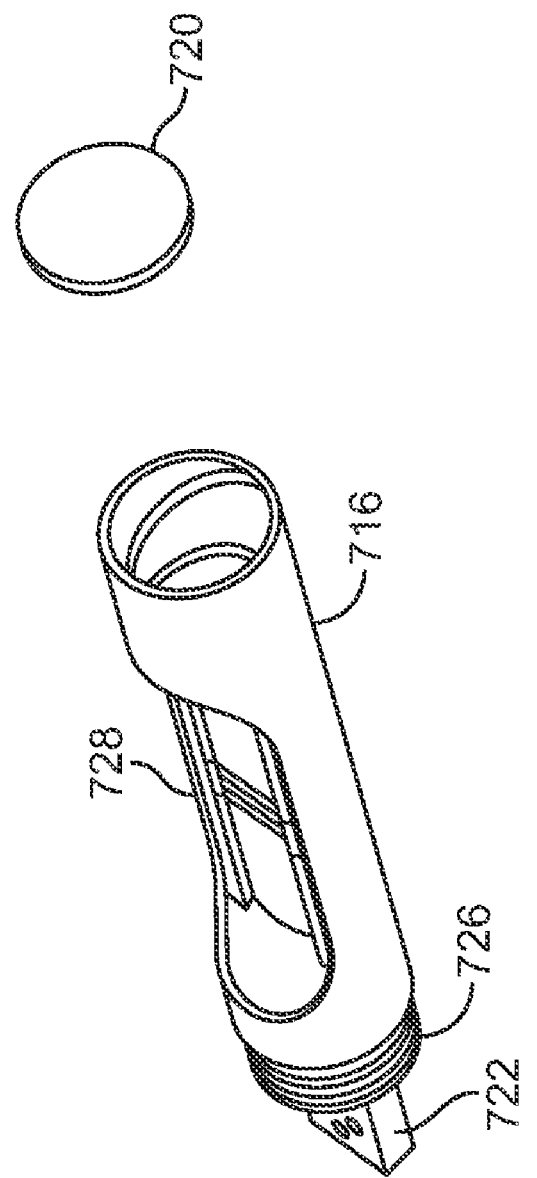
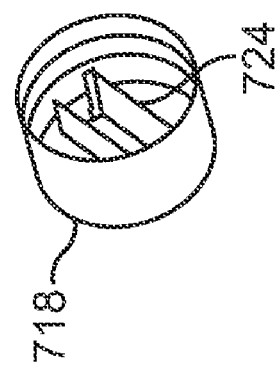
FIG. 44

LIP STICK UNIVERSAL SERIAL BUS FLASH DRIVE WITH DEPLOYING AND RETRACTING FUNCTIONALITIES

CROSS REFERENCE TO RELATED APPLICATIONS

This application is a continuation-in-part (CIP) of a co-pending U.S. patent application Ser. No. 11/309,594, entitled "Single-Chip Multi-Media Card/Secure Digital (MMC/SD) Controller Reading Power-On Boot Code from Integrated Flash Memory for User Storage", filed on Aug. 28, 2006, which is a CIP of U.S. patent application Ser. No. 10/707,277, entitled "Single-Chip USB Controller Reading Power-On Boot Code from Integrated Flash Memory For User Storage", filed on Dec. 2, 2003 and this application is a CIP of U.S. patent application Ser. No. 11/257,575 entitled "Reduced-Length, Low profile USB Device and Card-Like Carrier" and filed on Oct. 24, 2005. This application relates to U.S. Pat. No. 7,004,780, filed May 13, 2004, and entitled "PORTABLE COMPUTER PERIPHERAL APPARATUS WITH RETRACTABLE PLUG CONNECTOR', which is incorporated herein by reference as though set in full.

BACKGROUND OF THE INVENTION

1. Field of the Invention

The present invention relates generally to the field of universal serial bus (USB) flash drives and particularly to a method and apparatus for designing rotary USB flash drives having lipstick shape with deployable and retractable structures.

2. Description of the Prior Art

As computers have gained enormous popularity in recent decades, so has the need for better and more efficient ways of storing memory. Notable among memory devices are the portable ones that may be carried around by the user to access computers at different locations. This is particularly common in the case of personal computers (PC) where the need often arises to transfer data from one PC to another. Examples of portable memory devices include nonvolatile memory devices such as a universal serial bus (USB) flash drive that is removably connectable to a computer.

Universal serial bus (USB) flash drives are available in various shapes and forms. The USB flash drive needs a USB plug connector to be coupled to a USB port of a host device such as a PC. The USB flash drive generally has a metal casing and a cover which is screwed in or otherwise attached to the casing. To access the USB plug connector the user needs to open the metal cover and put it back on the casing after finishing the work with the USB flash drive. The shape of the casing and cover may be in the form of a pen or some other configuration.

However, use of the metallic parts such as the casing and the cover generally results in a heavy USB flash drive which is not very convenient to carry. The dimensions of the casing and cover are often large resulting in a long USB flash drive which is another impediment to easy carriage of the unit. In addition, once the cover is removed, it may be lost or forgotten and not be replaced.

It is therefore desirable to design and develop a USB flash drive with a relatively short and compact configuration that is light and may therefore be easily carried around by the user. In particular, packaging style and shape of the portable USB flash drive maybe improved to generate additional interest and enthusiasm in using the device. In addition, the desired USB flash drive should not incur substantial cost of manufacturing but should rather improve the manufacturing and assembly process over the existing USB flash drives with metallic components.

SUMMARY OF THE INVENTION

Briefly, an embodiment of the present invention includes a universal serial bus (USB) flash drive rotary device is disclosed to include a plastic frame including a USB flash drive and a USB plug connector and a rotary tube at least partially enclosing said plastic frame for deploying said USB plug connector, the USB flash drive is coupled to the USB plug connector, the rotary tube is turned to retract said USB plug connector, the USB flash drive rotary device is for deploying the USB plug connector to couple the USB flash drive to a USB port.

The foregoing and other objects, features and advantages of the present invention will be apparent from the following detailed description of the preferred embodiments which make reference to several figures of the drawing.

IN THE DRAWINGS

FIG. 1(a) shows a universal serial bus (USB) flash drive rotary device 10 to include a rotary tube 16, an end tube 14 and a USB plug connector 12, in accordance with an embodiment of the present invention.

FIG. 1(b) shows a detailed view of the USB flash drive rotary device 10 to include the end tube 14, rotary tube 16, printed circuit board (PCB) assembly 20, PCB cover 26 and a PCB holder 24, in accordance with an embodiment of the present invention.

FIG. 2 shows two views 32 and 34 of the end tube 40, in accordance with an embodiment of the present invention.

FIG. 3 shows a rotary tube 46 is shown to include two steps 50, two spiral slots 52 and a rotary tube end stop 48, in accordance with an embodiment of the present invention.

FIG. 4 shows a top view 56 and a bottom view 58 of the PCB holder, in accordance with an embodiment of the present invention.

FIG. 5(a) shows a standard PCB assembly 70 to include a USB plug connector 72, four cut-outs 74 and a PCB substrate 76, in accordance with an embodiment of the present invention.

FIG. 5(b) shows an USB memory card 78 with a PCB assembly and a USB metal plug which is used in place of the standard PCB assembly 70 and a USB plug connector 72, in accordance with an alternative embodiment of the present invention.

FIG. 5(c) shows a single chip USB memory card 80 which is used in other embodiments of the present invention in place of the standard PCB assembly 70 and a USB plug connector 72.

FIG. 6(a) shows a top view 84 and a bottom view 86 of the PCB cover, in accordance with an embodiment of the present invention.

FIG. 6(b) shows a side view of the plastic frame 97 to include PCB cover 109, PCB holder 98 and spiral tabs 99 and 106, in accordance with an embodiment of the present invention.

FIG. 7(a) shows a detailed view of internal components of the plastic frame to include a PCB cover 107, a PCB assembly 116 and a PCB holder 112, in accordance with an embodiment of the present invention.

FIG. 7(b) shows an assembled view of the plastic frame 118, in accordance with an embodiment of the present invention.

FIG. 8 shows an assembled view of a plastic frame 120 and rotary tube 126 to include spiral tabs 124, spiral slots 128 and rotary tube ridges 122, in accordance with an embodiment of the present invention.

FIG. 9 shows an assembled view of the rotary tube 148 and plastic frame 142 and a separate end tube 130 to include notches 136, recess slots 138, spiral tabs 146, spiral slots 140, rotary tube ridges 144 and end tube ridges 134, in accordance with an embodiment of the present invention.

FIG. 10 shows a USB flash drive rotary device 151 in the deployed position to include a rotary tube 152, an end tube 162, a USB plug connector 166, spiral slots 156, spiral tabs 154, recess slots 158 and notches 160, in accordance with an embodiment of the present invention.

FIG. 11 shows a USB flash drive rotary device 173 in the retracted position to include a rotary tube 176, an end tube 182, a USB plug connector 184, spiral slots 174, spiral tabs 172, notches 178 and recess slots 180, in accordance with an embodiment of the present invention.

FIG. 12(a) shows an alternative embodiment of a USB flash drive rotary device 194 to include a USB plug connector 196, an end tube 198 and a rotary tube 200.

FIG. 12(b) shows a detailed view of the internal components of the USB flash drive rotary device 194 to include the end tube 198, PCB assembly 214, PCB cover 218, PCB holder 216 and rotary tube 200, in accordance with an embodiment of the present invention.

FIG. 13(a) shows an outer view of the end tube 232 to include a cut-out 234 and two ridges 236, in accordance with an embodiment of the present invention.

FIG. 13(b) shows an inner view of the end tube 232 to include an end stop 240 and two notches 238, in accordance with an embodiment of the present invention.

FIG. 14 shows a rotary tube 230 is shown to include two ridges 248, spiral slots 246 and an end stop 244, in accordance with an embodiment of the present invention.

FIG. 15 shows a top view 250 and a bottom view 252 of the PCB holder to include a channel 254, four slots 256, recess slot 258 and a button 260, in accordance with an embodiment of the present invention.

FIG. 16 shows a standard PCB assembly 262 to include a USB plug connector 264, four cut-outs 266 and a PCB substrate 268, in accordance with an embodiment of the present invention.

FIG. 17 shows a top view 270 and a bottom view 272 of the PCB cover to include a recess slot 274, button 276, channel 280 and four tabs 284, in accordance with an embodiment of the present invention.

FIG. 18(a) shows a detailed view of the internal components of a plastic frame to include a PCB cover 290, a PCB assembly 294 and a PCB holder 296, in accordance with an embodiment of the present invention.

FIG. 18(b) shows an assembled view of the plastic frame 300, in accordance with an embodiment of the present invention.

FIG. 19 shows an assembled view of a plastic frame 302 and rotary tube 306 to include buttons 308 and rotary tube ridges 304, in accordance with an embodiment of the present invention.

FIG. 20 shows an assembled view of a rotary tube 314 and plastic frame 312 and a separate end tube 332 to include notches 324, end tube ridges 326, recess slots 322, rotary tube ridges 316, buttons 320 and spiral slots 318, in accordance with an embodiment of the present invention.

FIG. 21 shows a USB flash drive rotary device 338 in the deployed position to include a rotary tube 342, buttons 344, spiral slots 346, recess slots 348, notches 350, end tube 352 and a USB plug connector 354, in accordance with an embodiment of the present invention.

FIG. 22 shows a USB flash drive rotary device 360 in the retracted position to include a rotary tube 368, buttons 364, recess slots 370, spiral slots 366, notches 374, end tube 372 and a USB plug connector 376, in accordance with an embodiment of the present invention.

FIG. 23(a) shows an alternative embodiment of a USB flash drive rotary device 390 to include a USB plug connector 392, an end tube 394 and a rotary tube 396, in accordance with an embodiment of the present invention.

FIG. 23(b) shows a detailed view of the internal components of the USB flash drive rotary tube 390 to include the end tube 394, rotary tube 396, PCB assembly 402, PCB cover 410, PCB holder 414 and two springs 406 and 408, in accordance with an embodiment of the present invention.

FIG. 24(a) shows an outer view of the end tube 420 to include the cut-out 424 and ridges 422, in accordance with an embodiment of the present invention.

FIG. 24(b) shows an inner view of the end tube 420 to include slots 426, pins 428 and ridges 422, in accordance with an embodiment of the present invention.

FIG. 25 shows a rotary tube 432 to include ridges 440, two deploying corners 436, two retracting corners 434 and two wedges 438, in accordance with an embodiment of the present invention.

FIG. 26 shows a top view 442 and a bottom view 446 of the PCB holder to include a channel 448, four slots 450, a pointer 452, bar 454 and a pin 456, in accordance with an embodiment of the present invention.

FIG. 27 shows a standard PCB assembly 464 to include a PCB substrate 462, four cut-outs 458 and a USB plug connector 460, in accordance with an embodiment of the present invention.

FIG. 28 shows a top view 466 and a bottom view 468 of the PCB cover, in accordance with an embodiment of the present invention.

FIG. 29(a) shows a detailed view of internal components of the plastic frame to include a PCB cover 482, PCB assembly 492 and a PCB holder 494, in accordance with an embodiment of the present invention.

FIG. 29(b) shows an assembled view of the plastic frame, in accordance with an embodiment of the present invention.

FIG. 30 shows an assembled view of the plastic frame 498 and rotary tube 504 to include pointer 502 and ridges 508, in accordance with an embodiment of the present invention.

FIG. 31 shows an assembled view of rotary tube 534 and plastic frame 538 and a separate end tube 512 to include pins 516, ridges 514, slots 518, springs 522, pin 526, bars 528, pointers 530, wedges 532 and ridges 536, in accordance with an embodiment of the present invention.

FIG. 32 shows a USB flash drive rotary device 540 in the deployed position to include a rotary tube 542, end tube 552, USB plug connector 554, bars 546, slots 548 and springs 550, in accordance with an embodiment of the present invention.

FIG. 33 shows a USB flash drive rotary device 560 in the retracted position to include a rotary tube 562, end tube 572, USB plug connector 570, slots 568, bars 566 and springs 574, in accordance with an embodiment of the present invention.

FIG. 34(a) shows a USB flash drive rotary device 600 with a fingerprint sensor 606 to include a rotary tube 604 and an end tube 602, in accordance with an embodiment of the present invention.

FIG. 34(b) shows internal components of the USB flash drive rotary device 600 to include the end tube 602, PCB cover 610, PCB assembly 612, PCB holder 614, rotary tube 604 and an end button 608, in accordance with an embodiment of the present invention.

FIG. 35 shows an end tube 620 to include ridges 622, end stop surfaces 624 and end tube cut-out 626, in accordance with an embodiment of the present invention.

FIG. 36 shows a rotary tube 628 to include grooves 630, cut-out clearance 632 and spiral slots 634, in accordance with an embodiment of the present invention.

FIG. 37 shows a PCB assembly 636 to include a PCB substrate 646, cut-out clearances 638 for tabs of the PCB holder, cut-out clearances 640 for tabs of the PCB cover, PCB end stop surfaces 642, USB plug connector 648 and fingerprint sensor 644, in accordance with an embodiment to the present invention.

FIG. 38 shows a PCB holder 650 to include tabs 652, buttons 656, PCB holding surfaces 654 and end stop surface 658, in accordance with an embodiment of the present invention.

FIG. 39 shows a top view 660 and a bottom view 662 of the PCB cover, in accordance with an embodiment of the present invention.

FIG. 40 shows an end button 678 to include a step 680 and end stop surface 682, in accordance with an embodiment of the present invention.

FIG. 44 shows a rotary tube 716, an end tube 718 and an end button 720, in accordance with an embodiment of the present invention.

Figure 45:
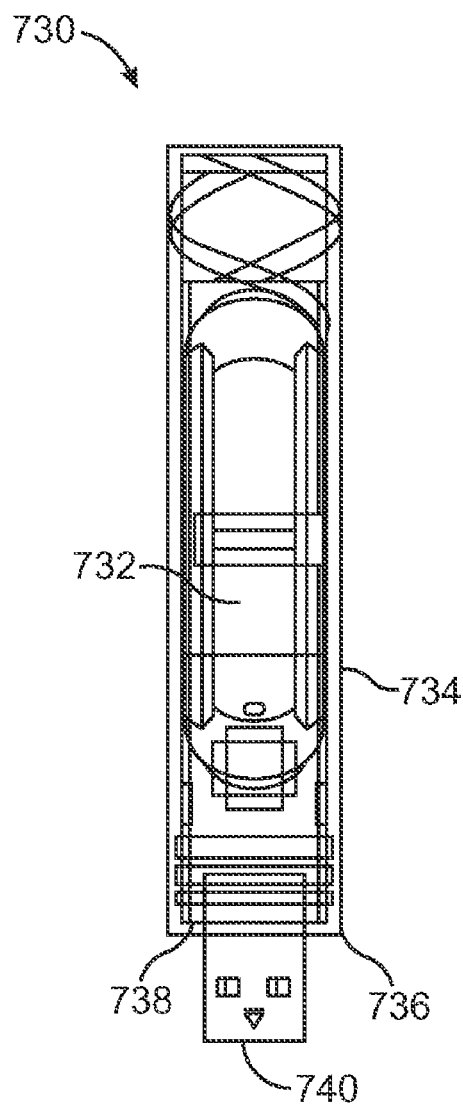

FIG. 45 shows a USB flash drive rotary device in the deployed position 730 to include fingerprint area 732, rotary tube 734, end tube 736, USB plug connector 740 and PCB end stop surfaces 738, in accordance with an embodiment of the present invention.

Figure 46:
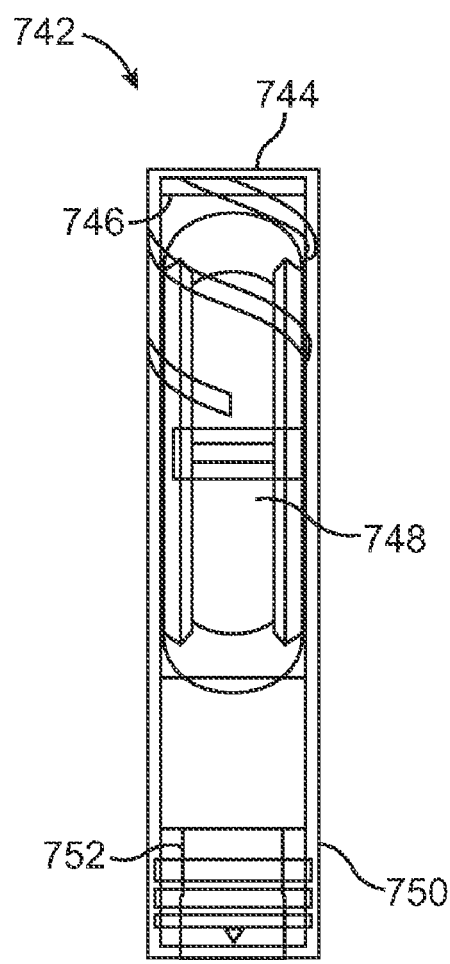

FIG. 46 shows a USB flash drive rotary device in the retracted position 742 to include end button 744, rotary tube 750, USB plug connector 752 and end stop surfaces of the PCB cover and holder 746, in accordance with an embodiment of the present invention.

DETAILED DESCRIPTION OF THE PREFERRED EMBODIMENTS

Figure 1A:
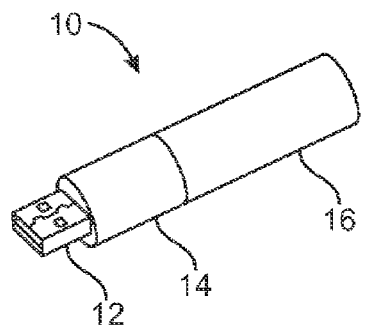

Referring now to FIG. 1(a), a universal serial bus (USB) flash drive rotary device 10 is shown to include a rotary tube 16, an end tube 14 and a USB plug connector 12, in accordance with an embodiment of the present invention. The USB flash drive rotary device 10 is for deploying and retracting the USB plug connector 12 which is shown in FIG. 1(a) to be in the deployed position. The USB plug connector 12 is used for connecting the USB flash drive rotary device 10 to a host device such as a personal computer (PC) by deploying the USB plug connector 12. The USB plug connector 12 is coupled to a USB port of a host device. When connected, information such as data and images may be transferred between the USB flash drive and the host device.

The USB plug connector 12 is deployed and retracted by turning the rotary tube 16 clockwise (CW) and counter clockwise (CCW), respectively, relative to the end tube 14. Thus, the USB flash drive rotary device 10 has a lipstick shape which makes it portable and quite convenient to be carried in, for example, a ladies' hand bag, much like a fashion item. However, it is more than an ordinary lipstick and may be referred to as a "tech lipstick" which functions as a portable storage device connectable to a wide variety of electronic devices for transfer and storage of information such as data and images.

Figure 1B:
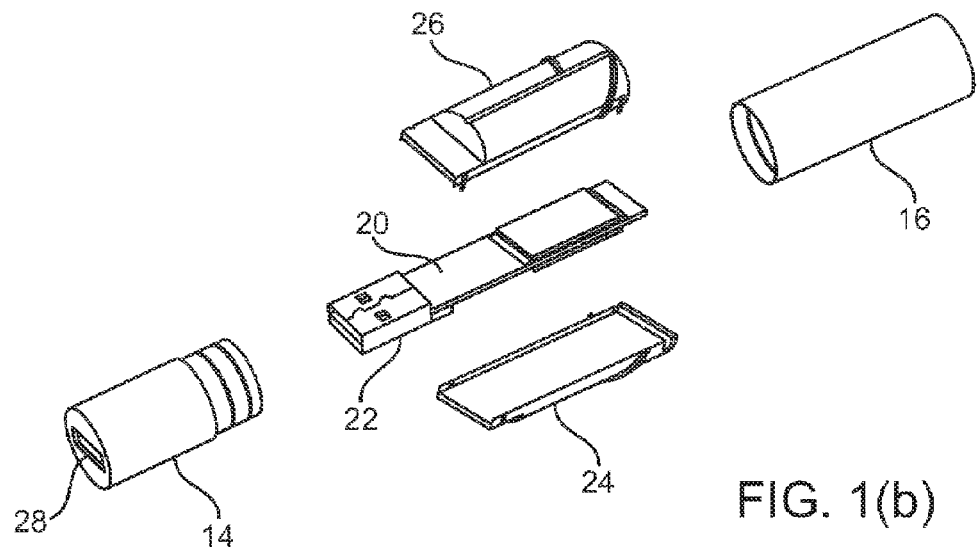

Referring now to FIG. 1(b), a detailed view of the USB flash drive rotary device 10 is shown to include the end tube 14, rotary tube 16, printed circuit board (PCB) assembly 20, PCB cover 26 and a PCB holder 24, in accordance with an embodiment of the present invention. The PCB assembly 20 includes the USB plug connector 22.

Figure 2:
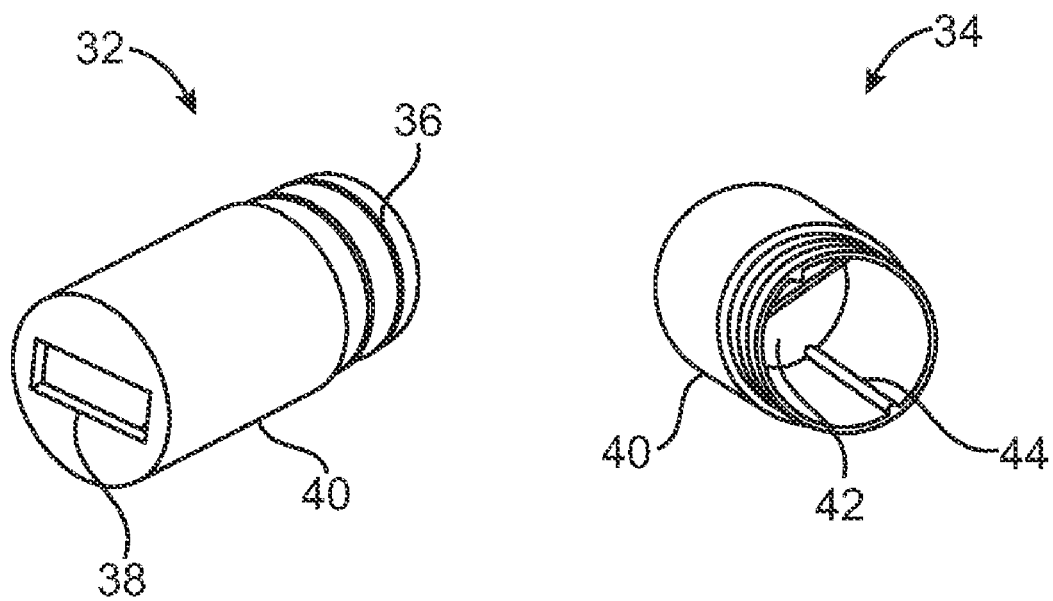

The PCB assembly 20 is positioned inside the PCB holder 24 and the PCB cover 26 and is secured onto the PCB holder 24 to form a plastic frame. The PCB holder 24 is positioned substantially on the bottom of the PCB assembly 20 and the PCB cover 26 is positioned substantially on top of the PCB assembly 20. Thus the PCB assembly 20 is partially enclosed by the PCB cover 26 and the PCB holder 24. One end of the plastic frame is pressed inside of the rotary tube 16 to be secured therein. The other end of the plastic frame having the USB plug connector 22 is pressed inside the end tube 14 so that the USB plug connector 22 may be deployed and retracted through the cut-out 28 of the end tube 14. As shown in FIGS. 1 and 2, the rotary tube 16 is rotatably connected to the end tube 14 with the latter housing the USB plug connector 12.

Referring now to FIG. 2, an perspective front view 32 of the end tube 40 is shown and a perspective back view 34 of the end tube 40 is shown, in accordance with an embodiment of the present invention. The end tube 40 is the same as the end tube 14 of FIG. 1. In view 32, the end tube 40 is shown to include a plurality of ridges 36 and a cut-out 38 to accommodate the USB plug connector 22 of FIG. 1(b). In other embodiments of the present invention the end tube 40 has one or more ridges. The ridges 36 are used to secure the end tube 40 to the rotary tube 16, as described in more detail hereinbelow.

Shown in the view 34 are the notches 44 and a tube end stop 42, in accordance with an embodiment of the present invention. The end tube 40 has two notches 44 but in other embodiments of the present invention the end tube 40 has one or more notches. Notches 44 are aligned with recess slots on the PCB cover 26 and PCB holder 24 to slide the plastic frame into the end tube 40 so that the USB plug connector 22 may move through the cut-out 38 to be deployed. The tube end stop 42 is used to stop the plastic frame from moving any further once the PCB plug connector 22 is deployed.

The ridges 36 are positioned substantially at one of the end tube 40 to secure the end tube 40 to the rotary tube 16 and the cut-out 38 is positioned to allow the USB plug connector to be deployed or retracted.

Figure 3:
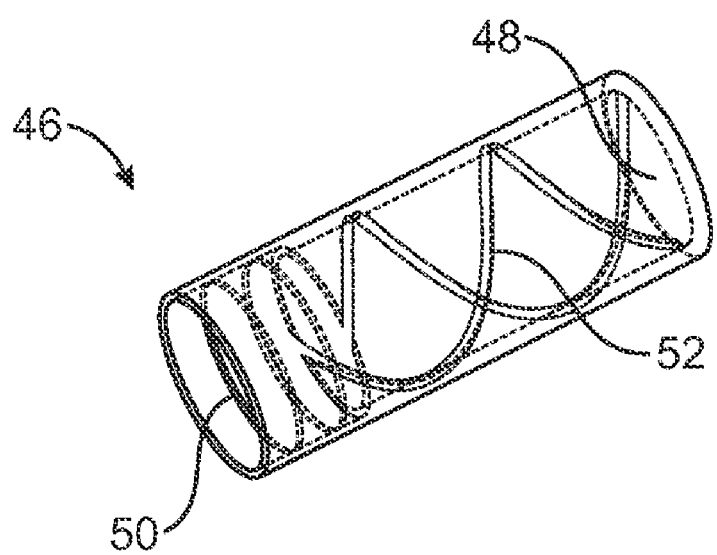

Referring now to FIG. 3, a rotary tube 46 that may be used in the USB flash drive rotary device 10 as the rotary tube 16 is shown to include two ridges 50, two spiral slots 52 and a rotary tube end stop 48, in accordance with an embodiment of the present invention. In other embodiments of the present invention rotary tube 46 has one or more ridges and one or more spiral slots 52. The structure of the rotary tube 46, being hollow inside, serves to encapsulated the spiral slots 52.

The PCB cover 26 and PCB holder 24 of FIG. 1(b) include spiral tabs which move inside the spiral slots 52 to deploy and retract the USB plug connector 22. Specifically, by turning the rotary tube 46 CW the spiral tabs move inside the spiral slots 52 to deploy the USB plug connector 22 out of the end tube 14. Conversely, by turning the rotary tube 46 CCW, the spiral tabs move inside the spiral slots 52 to retract the USB plug connector 22 back into the end tube 14.

The rotary tube end stop 48 prevents the plastic frame from moving any further in the rotary tube 46 when the USB plug connector 22 is fully retracted.

To assemble the USB flash drive rotary device 10, the end tube 14 is pressed into the rotary tube 46 partially enclosing the plastic frame. The ridges 36 of the end tube pass the ridges 50 of the rotary tube to prevent the end tube 40 from moving out of the rotary tube 46. Rotary tube 46 can only rotate CW or CCW relative to the end tube 14. The outer surfaces of the rotary tube 46 and end tube 40 comprise the outer surface of the USB flash drive rotary device 10. Ridges 36 are part of the end tube 40 and ridges 50 are part of rotary tube 46. End tube 40 and rotary tube 46 are made of plastic which enable ridges 36 and 50 to pass each other without being permanently deformed upon force pressing rotary tube 46 into end tube 40. The assembly process is performed using alignment fixture and press tool to hold end tube 40 and rotary tube 46 in proper positions to be pressed together. A user is able to remove the end tube 40 from the rotary tube 46 if the user applies the same force as the press tool. Under normal circumstances, after the ridges pass each other, the end tube 40 cannot be retracted from rotary tube 46. The ridges being made of plastic pass each other due to elasticity of the plastic material.

Figure 4:
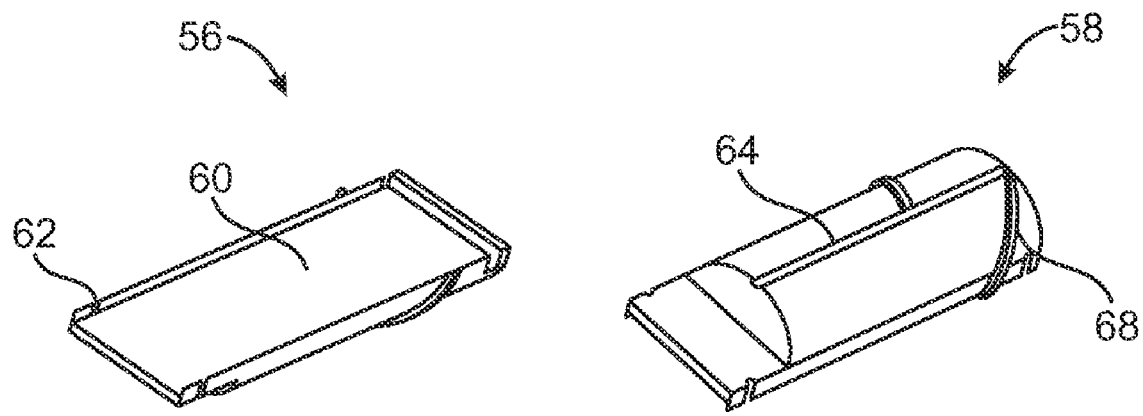

Referring now to FIG. 4, a top view 56 and a bottom view 58 of the PCB holder is shown, in accordance with an embodiment of the present invention. Shown in top view 56 is a channel 60 and four slots 62. Shown in bottom view 58 are recess slots 64 and spiral tabs 68. The PCB assembly 20 in FIG. 1(b) is positioned in channel 60 by being slid therein. To secure the PCB assembly in place the PCB cover 26 is positioned on top of the PCB holder and pressed therein to snap the tabs into the slots 62. The assembled unit forms the plastic frame.

The end of the plastic frame in close proximity of the PCB holder is pressed inside the rotary tube 46 which is turned until the spiral tabs 68 of the PCB holder and similar spiral tabs of the PCB cover move into the spiral slots 52 of the rotary tube 46.

To complete assembly of the USB flash drive rotary device the other end of the plastic frame having the USB plug connector 22 is positioned next to the end tube 40 such that the recess slot 64 is aligned with the notch 44. The plastic frame is then pressed into the end tube until the ridges 36 of the end tube pass the ridges 50 of the rotary tube 46.

Figure 5A:
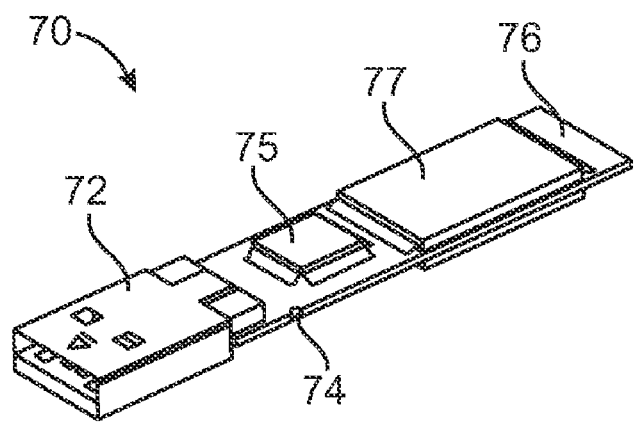

Referring now to FIG. 5(a), a standard PCB assembly 70 is shown to include a USB plug connector 72, four cut-outs 74 and a PCB substrate 76, in accordance with an embodiment of the present invention. The PCB substrate 76 is coupled to the USB plug connector 72. The PCB substrate 76 is positioned approximately centered relative to the USB plug connector 72. The PCB substrate 76 includes all the hardware devices such as the integrated circuits (IC) 77 and the controller 75. The cut-outs 74 provide clearance for the tabs of the PCB cover to be snapped into the slots 62 of the PCB holder.

Figure 5B:
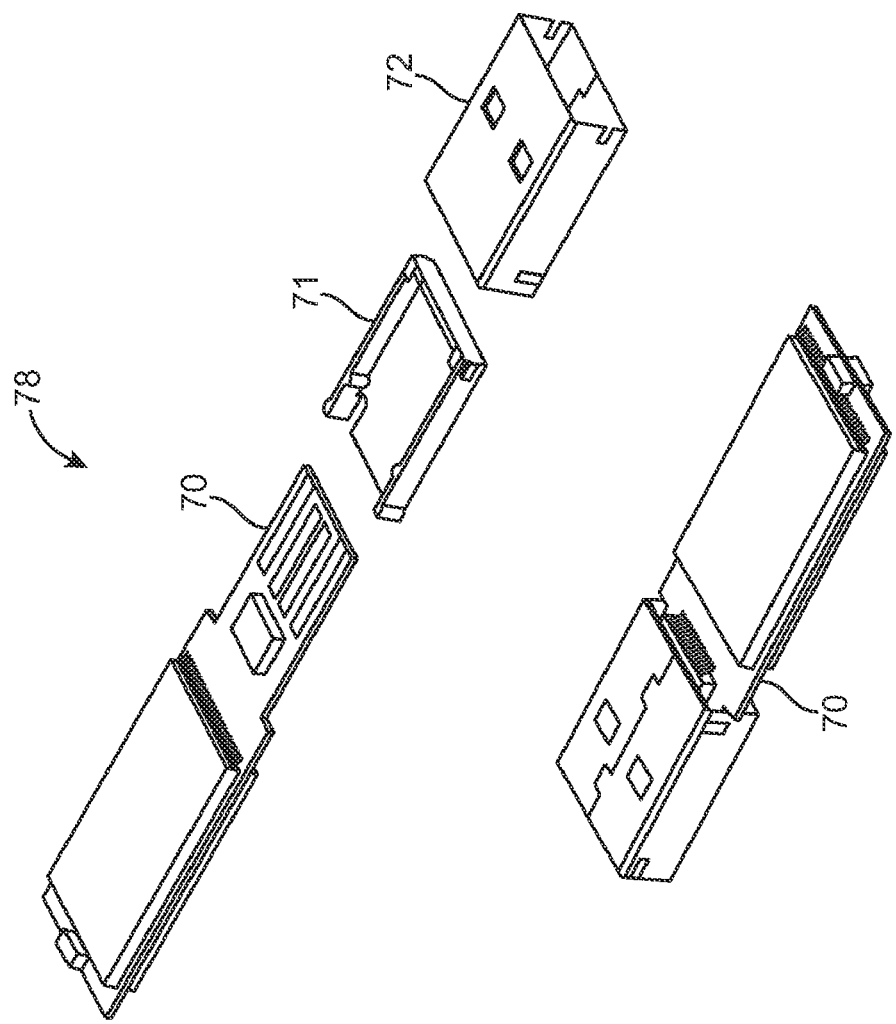

Referring now to FIG. 5(b), a USB memory card 78 with a standard PCB assembly and a USB metal plug is shown and is used in other embodiments of the present invention in place of the standard PCB assembly 70 and USB plug connector 72. The USB memory card 78 is shown to include the standard PCB assembly 70, a plastic PCB support 71, and the metal case 72. The end of PCB substrate with contact fingers is seated inside of the plastic support 71 snuggly fitting in the metal case 71. After assembly, the configuration of the PCB substrate with contact fingers, the plastic support 71, and the metal case 72 combination, referred to the USB metal plug is identical to the USB plug connector. The advantage of this USB memory card in compared with the standard PCB assembly and USB plug connector is this card has shorter length because a partial PCB substrate and the controller IC could be placed inside the USB metal plug as shown in FIG. 5(b).

Figure 5C:
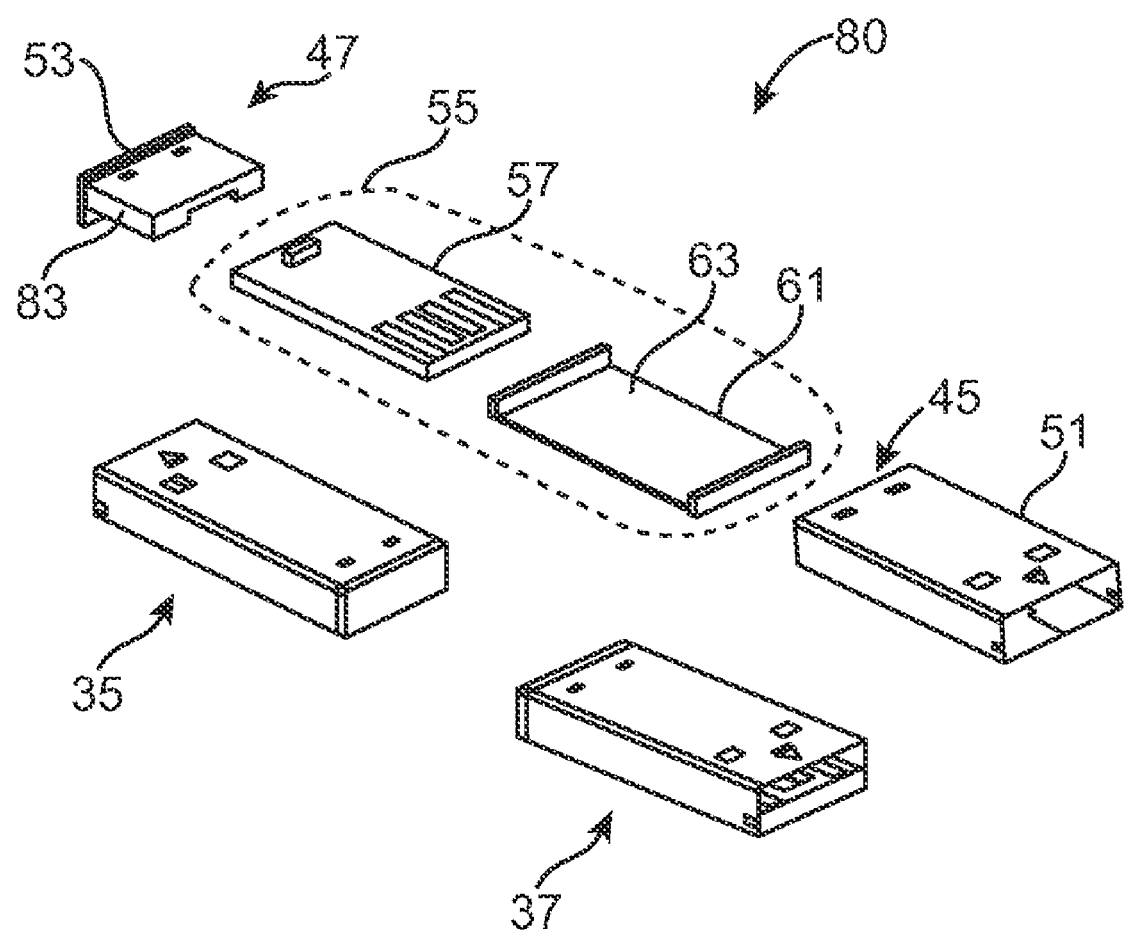

Referring now to FIG. 5(c), a single chip USB memory card 80 is shown and is used in other embodiments of the present invention in place of the standard PCB assembly 70 and a USB plug connector 72. The single chip USB memory card 80 can be implemented using the same described chip on board (COB) manufacturing method to build up an USB card using a core piece memory card 57 by placing it into the cavity 63 of a plastic substrate carrier 61 and then sliding the sub-assembly 55 into a metal case 51 followed by plugging an end piece 47 into the back end 45 of the metal case 51 to lock and secure the memory card 57 in a secure position in the chamber of metal case 51. The end piece 47 is made up of the plastic plug structure over mold onto a metal cover 53. The metal cover 53's height is higher than the thickness of a plastic plug structure 83. The final USB product front 37 and back 35 views are also shown in FIG. 5(c).

Figure 6A:
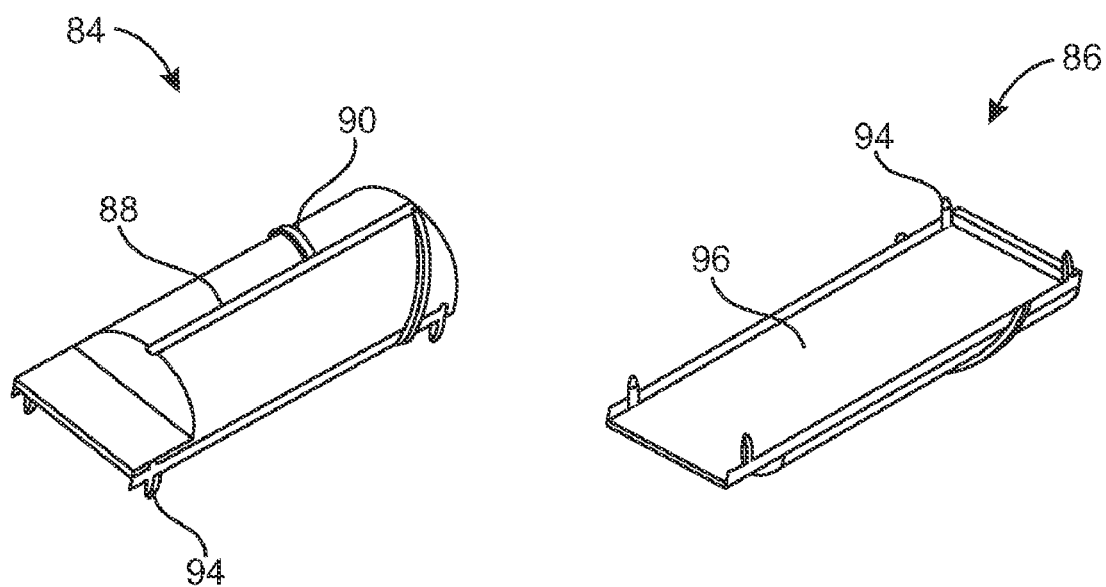

Referring now to FIG. 6(a), a top view 84 and a bottom view 86 of the PCB cover is shown, in accordance with an embodiment of the present invention. Shown in top view 84 are the recess slot 88, spiral tabs 90 and tabs 94. Shown in bottom view 86 are the channel 96 and tabs 94.

To assemble the plastic frame channel 96 is positioned on top of the PCB assembly such that the tabs 94 are aligned with the cut-outs 74. The tabs 94 are then pressed into the slots 62 of the PCB holder to complete assembly of the plastic frame. The end of the plastic frame in closer proximity to the spiral tabs 90 is pressed into the rotary tube 46. The rotary tube 46 is then turned to move the spiral tabs 90 and 68 into spiral slots 52. Movement of spiral tabs 90 and 68 inside spiral slots 52 initiated by turning the rotary tube 46 CW or CCW causes the USB plug connector to be deployed or retracted.

Figure 6B:
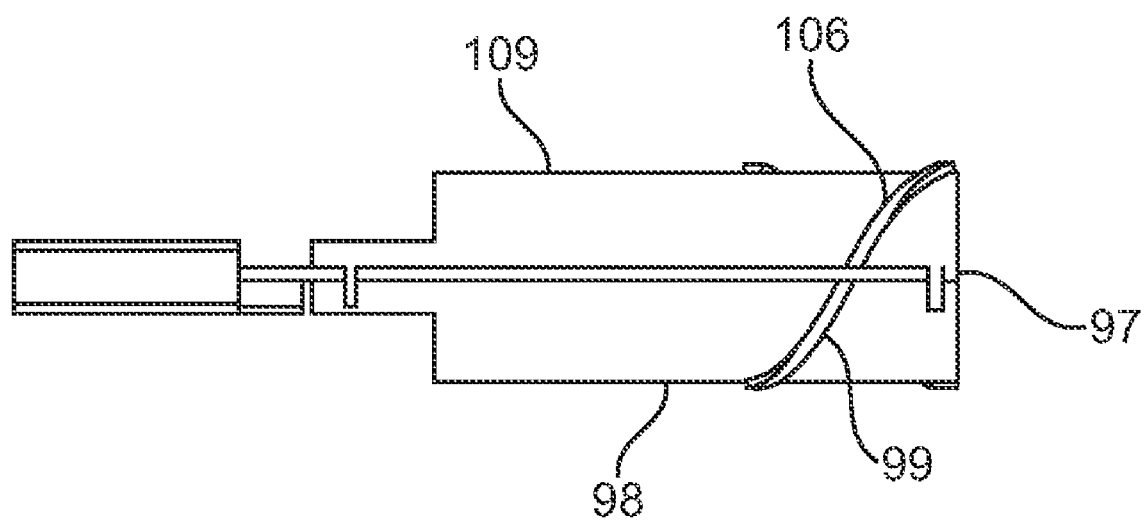

Referring now to FIG. 6(b), a side view of the plastic frame 97 is shown to include PCB cover 109, PCB holder 98 and spiral tabs 99 and 106, in accordance with an embodiment of the present invention. Spiral tabs 99 are part of the PCB holder 98 and spiral tabs 106 are part of the PCB cover 109. After tabs 94 are inserted into slots 62 to assemble the plastic frame 97, spiral tabs 99 and 106 are aligned and combine to form continuous long spiral tabs shown in FIG. 6(b). Combination of spiral tabs 99 and 106 move into spiral slots 52 to deploy and retract the USB plug connector.

Figure 7A:
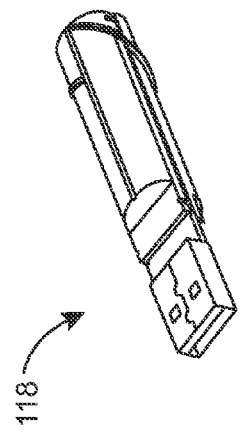

Referring now to FIG. 7(a), a detailed view of internal components of the plastic frame is shown to include a PCB cover 107, a PCB assembly 116 and a PCB holder 112, in accordance with an embodiment of the present invention. The PCB cover 107 includes tabs 106 and the PCB holder 112 includes slots 108. The PCB cover 107 is positioned on top of the PCB assembly such that the tabs 106 are aligned with the PCB cut-outs 74. The tabs are then pressed into the slots 108 to complete assembly of the plastic frame.

Figure 7B:
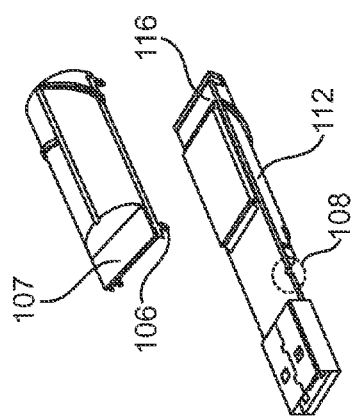

FIG. 7(b) shows an assembled view of the plastic frame 118, in accordance with an embodiment of the present invention.

Figure 8:
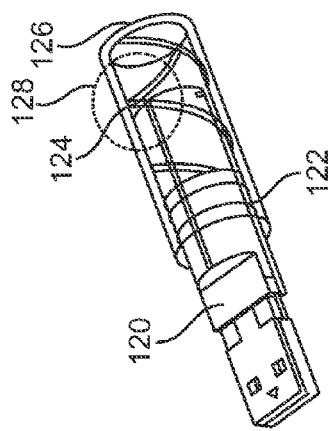

Referring now to FIG. 8, an assembled view of a plastic frame 120 and rotary tube 126 is shown to include spiral tabs 124, spiral slots 128 and rotary tube steps 122, in accordance with an embodiment of the present invention. The plastic frame 120 has been pressed into the rotary tube 126 which is turned to position the spiral tabs 124 into the spiral slots 128. Movement of spiral tabs 124 inside spiral slots 128 causes plastic frame 120 and consequently the USB plug connector to move in and out relative to the rotary tube 126.

Figure 9:
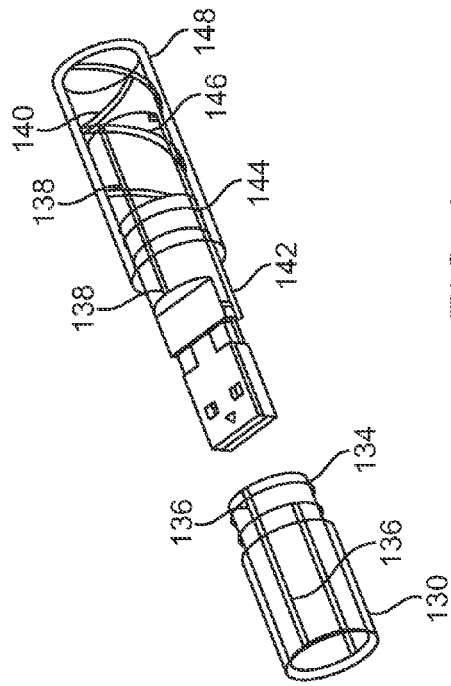

Referring now to FIG. 9, an assembled view of the rotary tube 148 and plastic frame 142 and a separate end tube 130 is shown to include notches 136, recess slots 138, spiral tabs 146, spiral slots 140, rotary tube ridges 144 and end tube ridges 134, in accordance with an embodiment of the present invention.

The plastic frame 142 has been positioned inside the rotary tube 148 such that spiral tabs 146 can move inside spiral slots 140. To assemble the USB flash drive rotary device, plastic frame 142 is pushed inside the end tube 130 so that the end tube 130 is positioned adjacent to the rotary tube 148. The notches 136 are aligned with the recess slots 138 and the end tube 130 is pushed inside the rotary tube 148 so that the notches 136 move inside the recess slots 138 until ridges 134 pass ridges 144 whereby the end tube 130 is secured to the rotary tube 148.

However, rotary tube 148 may still turn relative to the end tube 130 which causes the USB plug connector to be deployed or retracted according to CW or CCW rotation of the rotary tube 148.

Figure 10:
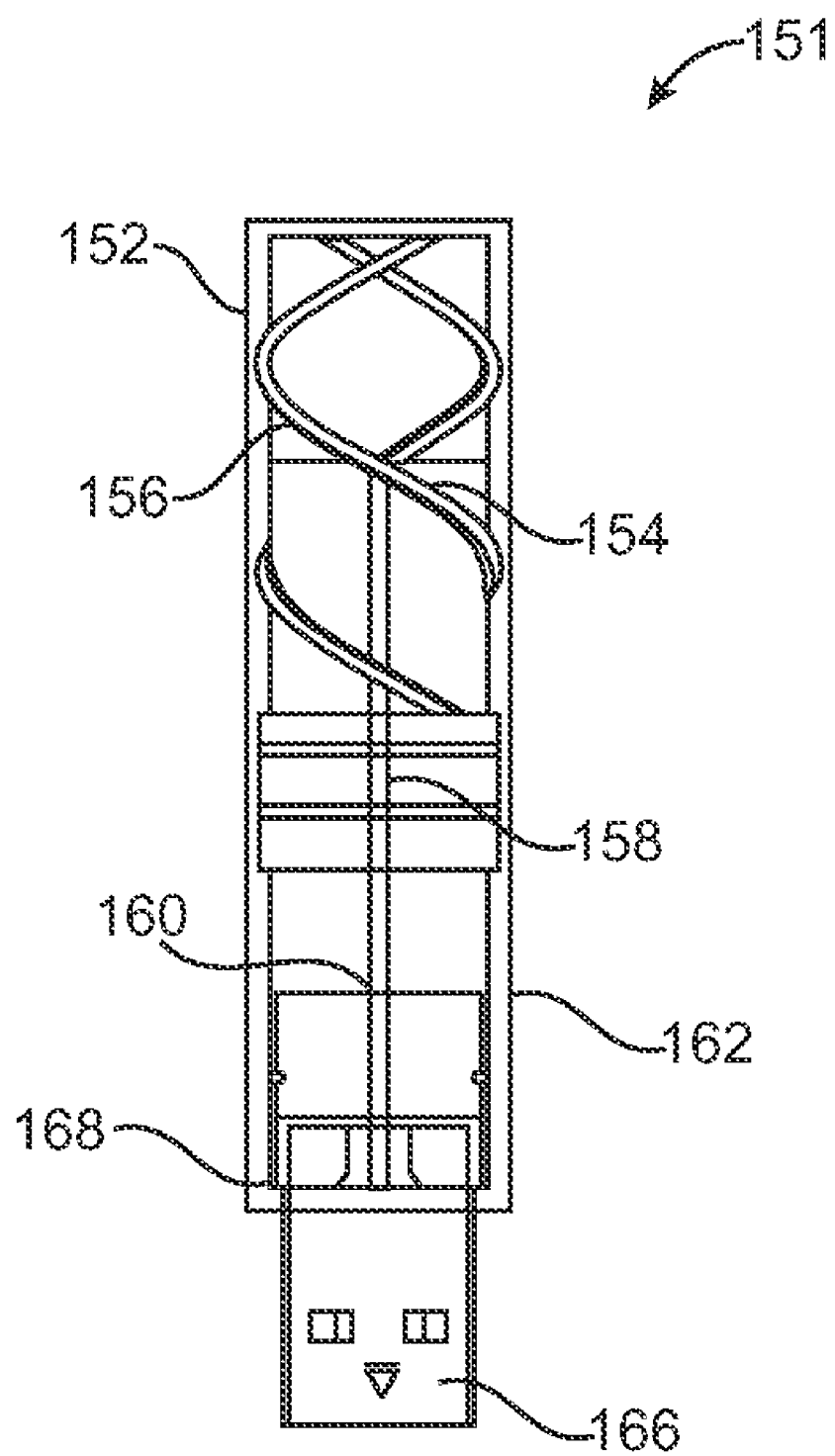

Referring now to FIG. 10, a USB flash drive rotary device 151 in the deployed position is shown to include a rotary tube 152, an end tube 162, a USB plug connector 166, spiral slots 156, spiral tabs 154, recess slots 158 and notches 160, in accordance with an embodiment of the present invention. As shown, notches 160 are at least partially positioned inside recess slots 158.

As rotary tube 152 is turned CW spiral tabs 154 move inside spiral slots 156 to push the USB plug connector 166 out of the end tube 162. As the plastic frame edges come in contact with the end-stop surface 168, the USB plug connector 166 is in the deployed position and the rotary tube 152 cannot be turned CW anymore.

Figure 11:
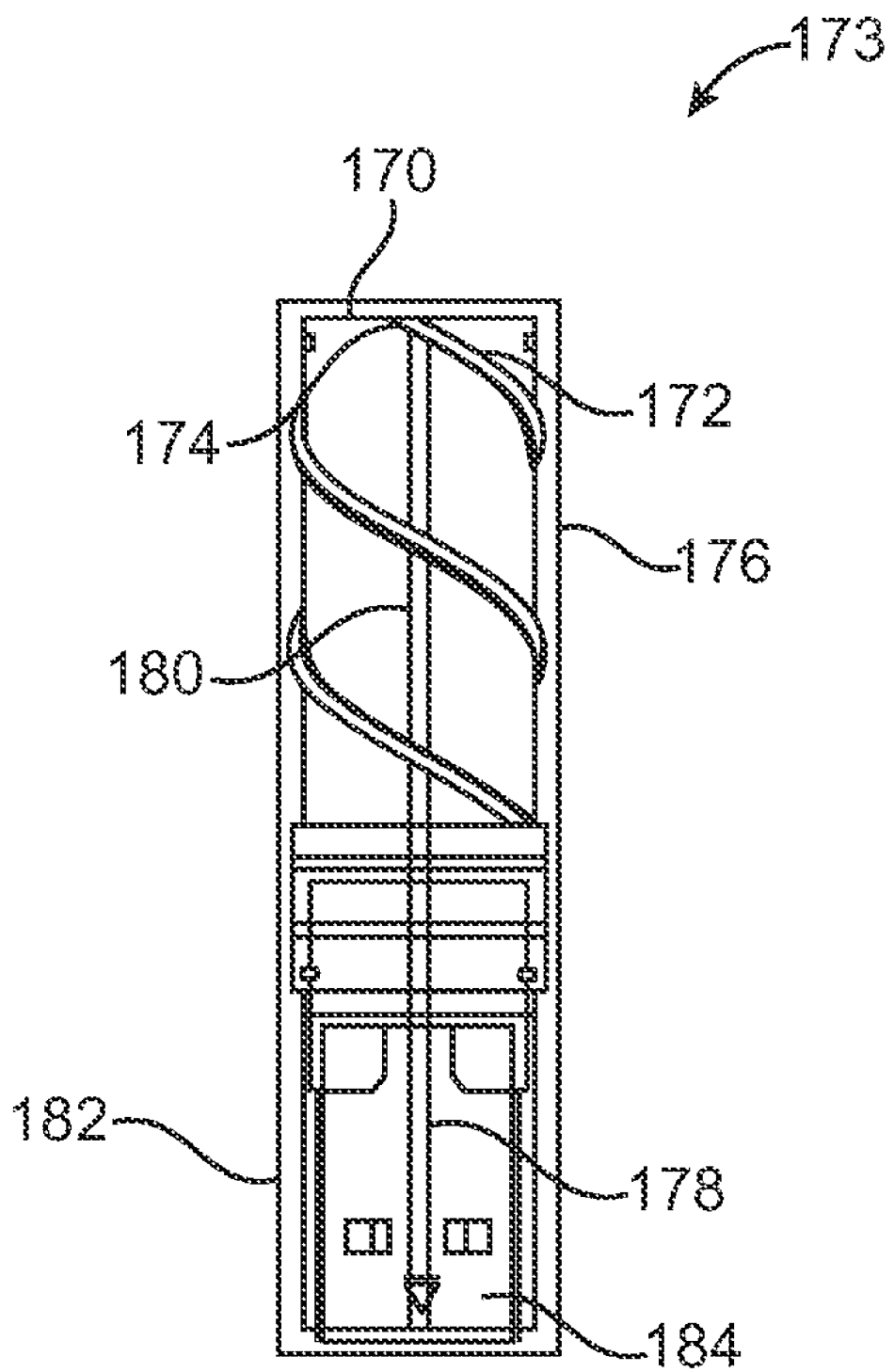

Referring now to FIG. 11, a USB flash drive rotary device 173 in the retracted position is shown to include a rotary tube 176, an end tube 182, a USB plug connector 184, spiral slots 174, spiral tabs 172, notches 178 and recess slots 180, in accordance with an embodiment of the present invention.

The rotary tube 176 is turned CCW causing spiral tabs 172 to move inside spiral slots 174 to retract the USB plug connector 184 inside the end tube 182. As the end of the plastic frame comes in contact with the end stop surface 170 of the rotary tube, the USB plug connector 184 reaches a fully retracted position wherein rotary tube 176 cannot be turned CCW anymore. Turning of rotary tube 176 CW would re-deploy the USB plug connector 184. In the retracted position notches 178 are positioned at least partially inside recess slots 180 to prevent the plastic frame from turning with rotary tube 176.

Figure 12A:
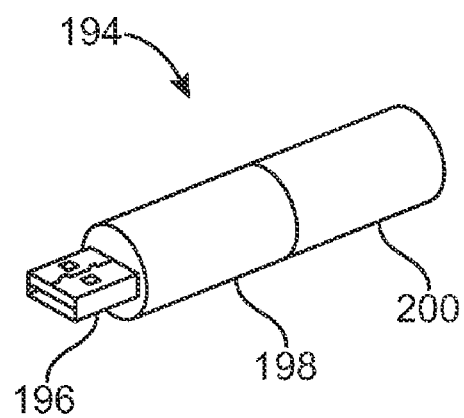

Referring now to FIG. 12(a), an alternative embodiment of a USB flash drive rotary device 194 is shown to include a USB plug connector 196, an end tube 198 and a rotary tube 200. The USB plug connector 196 may be deployed or retracted into the end tube 198 by turning the rotary tube 200 CW or CCW.

Figure 12B:
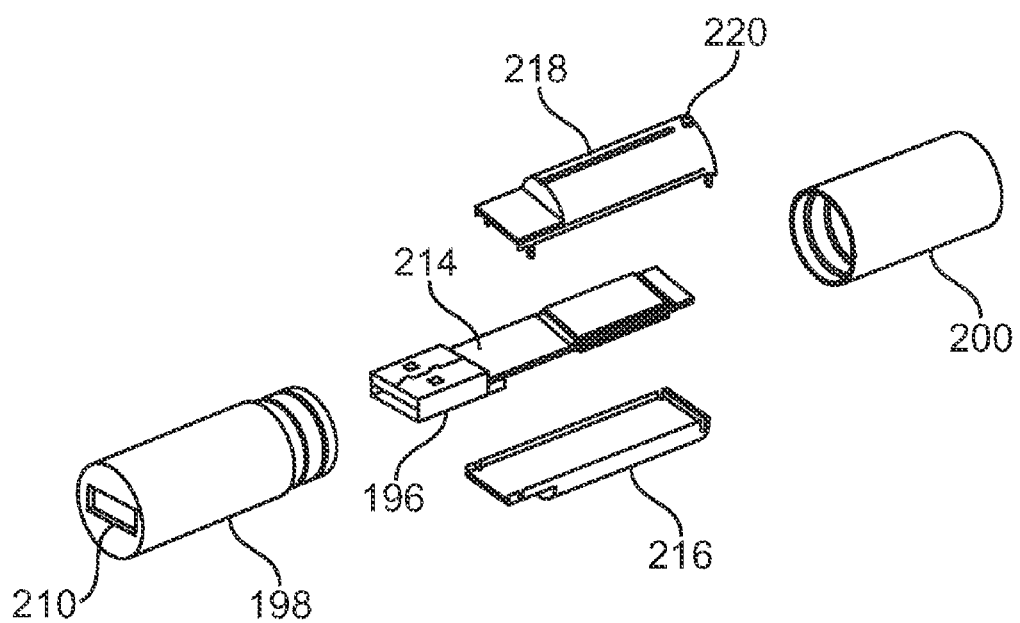

Referring now to FIG. 12(b), a detailed view of the internal components of the USB flash drive rotary device 194 is shown to include the end tube 198, PCB assembly 214, PCB cover 218, PCB holder 216 and rotary tube 200, in accordance with an embodiment of the present invention. The PCB assembly 214 includes the USB plug connector 196 and the end tube 198 includes a cut-out 210 through which the USB plug connector 196 is deployed and retracted.

Description of the end tube 198 and PCB assembly 214 is similar to that of the components 14 and 20 of the USB flash drive rotary device described in relation to FIG. 1. As shown in FIG. 12(b), the PCB cover 218 includes a button 220 and so does the PCB holder 216 albeit not visible in FIG. 12(b). Rotary tube 200 has spiral slots so that once assembled, button 220 and another button of the PCB holder 216 move inside spiral slots to deploy and retract the USB plug connector 196, as described in more detail hereinbelow.

The PCB assembly 214 is positioned inside the PCB holder 216 by being slid therein and the PCB cover 218 is secured onto the PCB holder 216 to form a plastic frame. Thus, the PCB assembly 214 is partially enclosed by the PCB cover 218 and PCB holder 216.

Figure 13A:
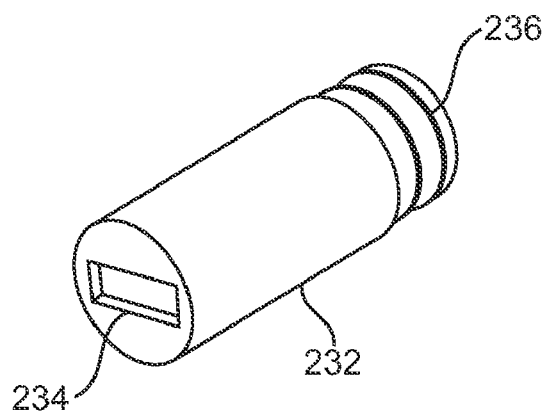
Figure 13B:
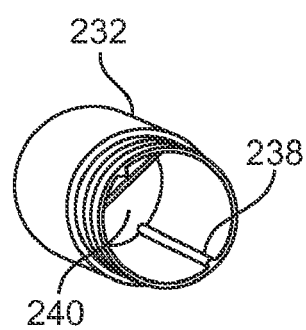

Referring now to FIG. 13(a), an outer view of the end tube 232 is shown to include a cut-out 234 and two ridges 236, in accordance with an embodiment of the present invention. FIG. 13(b) shows an inner view of the end tube 232 to include an end stop 240 and two notches 238, in accordance with an embodiment of the present invention. Description of ridges 236, notches 238, cut-out 234 and end stop 240 of the end tube 232 is similar to that of components 36, 44, 38 and 42 as described in relation to FIG. 2. In other embodiments of the present invention the end tube 232 has one or more ridges and one or more notches.

Figure 14:
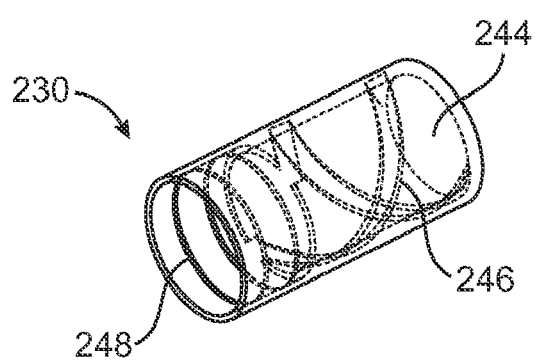

Referring now to FIG. 14, a rotary tube 230 is shown to include two ridges 248, spiral slots 246 and an end stop 244, in accordance with an embodiment of the present invention.

The button 220 and another button on the PCB holder 216 move inside spiral slots 246 to deploy and retract the USB plug connector 196. Specifically, by turning the rotary tube 230 CW the buttons move inside spiral slots 246 to deploy the USB plug connector 196. Conversely, by turning the rotary tube 230 CCW the buttons move inside spiral slots 246 to retract the USB plug connector 196 back into end tube 232.

Rotary tube end stop 244 prevents the plastic frame from moving any further in rotary tube 230 when the USB plug connector 196 is fully retracted.

To assemble the USB flash drive rotary device 194, the end tube 232 is pressed into the rotary tube 230 having partially enclosed the plastic frame. Ridges 236 of the end tube pass the ridges 248 of the rotary tube 230 to prevent the end tube 232 from moving out of the rotary tube 230. Rotary tube 230 can only rotate CW or CCW relative to end tube 232.

Figure 15:
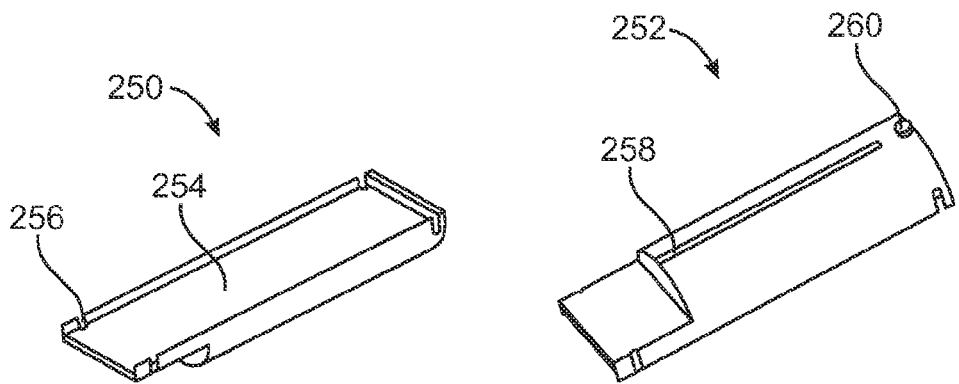

Referring now to FIG. 15, a top view 250 and a bottom view 252 of the PCB holder is shown to include a channel 254, four slots 256, recess slot 258 and a button 260, in accordance with an embodiment of the present invention. PCB assembly 214 shown in FIG. 12(b) is positioned in channel 254 by being slid therein. To secure the PCB assembly in place PCB cover 218 is positioned on top of the PCB holder and pressed therein to snap the tabs inside slots 256. The assembled unit comprises the plastic frame.

The end of the plastic frame in close proximity to the PCB holder is pressed inside rotary tube 230 which is turned until buttons 260 and 220 move into spiral slots 246 of the rotary tube 230.

To complete the assembly of the USB flash drive rotary device the other end of the plastic frame having the USB plug connector 196 is positioned next to end tube 232 such recess slot 258 is aligned with the notch 238. The plastic frame is then pressed into the end tube 232 until ridges 236 of the end tube pass ridges 248 of the rotary tube.

Figure 16:
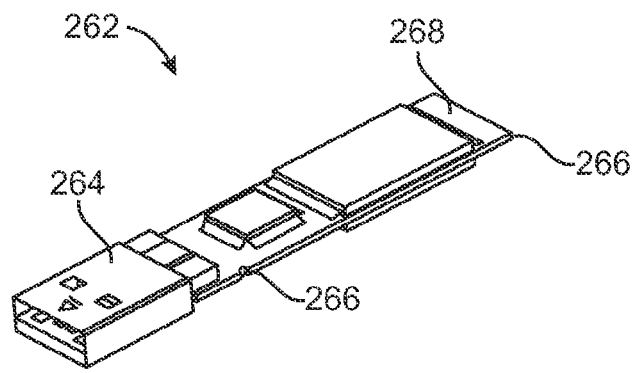

Referring now to FIG. 16, a standard PCB assembly 262 is shown to include a USB plug connector 264, four cut-outs 266 and a PCB substrate 268, in accordance with an embodiment of the present invention. PCB substrate 268 is coupled to the USB plug connector 264. PCB substrate 268 is positioned approximately centered relative to the USB plug connector 264. PCB substrate 268 includes all the hardware devices such integrated circuits (IC) and flash memory unit. The cut-outs 266 provide clearance for the tabs of the PCB cover to be snapped into slots 256 of the PCB holder.

In other embodiments of the present invention a USB memory card with a standard PCB assembly and a USB metal plug or a single chip USB memory card is used in place of the standard PCB assembly 262, as described in FIGS. 5(b) and 5(c) respectively.

Figure 17:
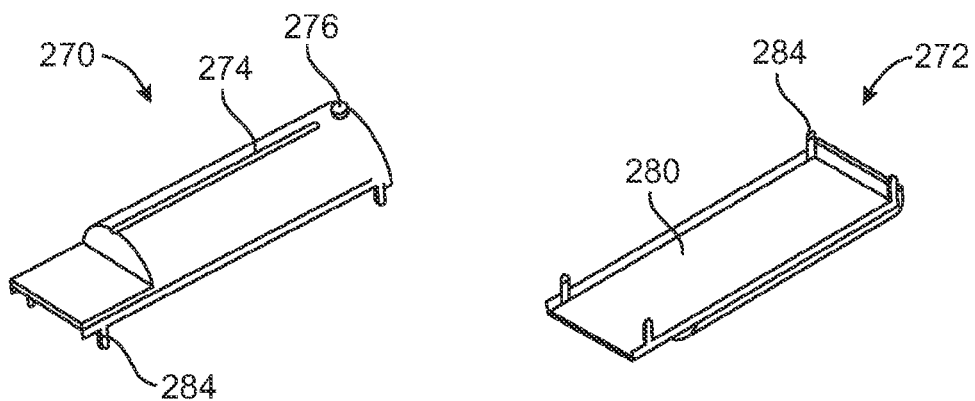

Referring now to FIG. 17, a top view 270 and a bottom view 272 of the PCB cover is shown to include a recess slot 274, button 276, channel 280 and four tabs 284, in accordance with an embodiment of the present invention.

To assemble the plastic frame, channel 280 is positioned on top of the PCB assembly 262 such that tabs 284 are aligned with the cut-outs 266. Tabs 284 are then pressed into slots 256 of the PCB holder to complete the assembly of the plastic frame. The end of the plastic frame in close proximity to the buttons 276 and 260 is pressed into rotary tube 230 which is then turned to move the buttons 276 and 260 into spiral slots 246. Movement of buttons 276 and 260 inside spiral slots 246 initiated by turning rotary tube 230 CW or CCW causes the USB plug connector 264 to be deployed or retracted.

Figure 18A:
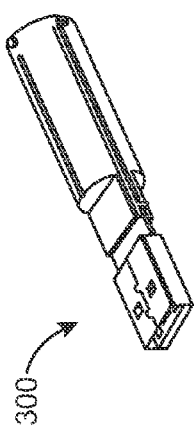

Referring now to FIG. 18(a), a detailed view of the internal components of a plastic frame is shown to include a PCB cover 290, a PCB assembly 294 and a PCB holder 296, in accordance with an embodiment of the present invention. The PCB cover 290 includes tabs 298 and the PCB holder includes slots 292. PCB cover 290 is positioned on top of the PCB assembly 294 such that tabs 298 are aligned with the cut-outs 266. Tabs 298 are then pressed into slots 292 to complete the assembly of the plastic frame.

Figure 18B:
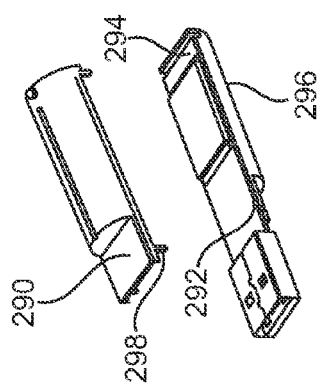

FIG. 18(b) shows an assembled view of the plastic frame 300, in accordance with an embodiment of the present invention.

Figure 19:
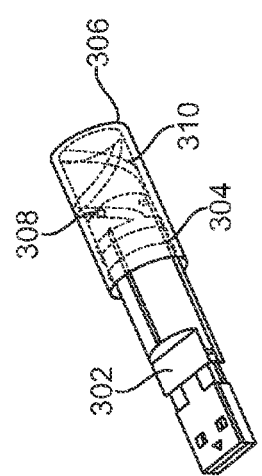

Referring now to FIG. 19, an assembled view of a plastic frame 302 and rotary tube 306 is shown to include buttons 308 and rotary tube ridges 304, in accordance with an embodiment of the present invention. The plastic frame 302 has been positioned inside rotary tube 306 which is turned to position buttons 308 inside spiral slots 310. Movement of buttons 308 inside spiral tabs 310 causes plastic frame 302 and consequently the USB plug connector to move in or out relative to rotary tube 306.

Figure 20:
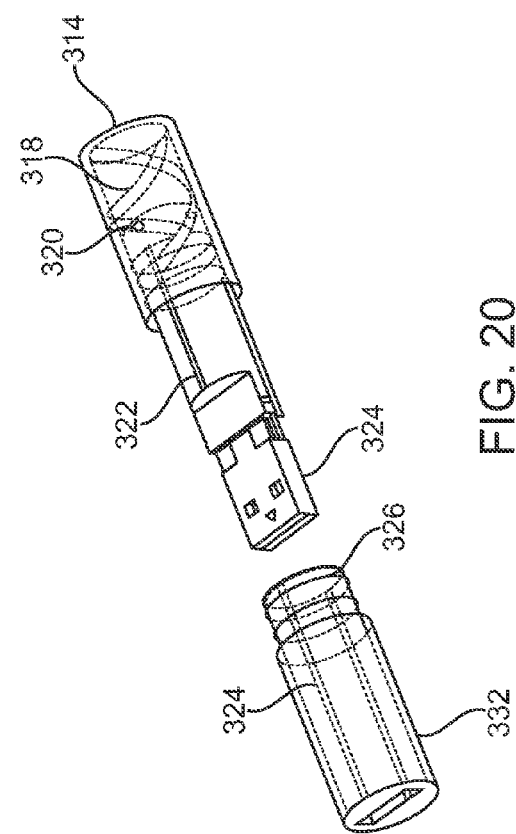

Referring now to FIG. 20, an assembled view of a rotary tube 314 and plastic frame 312 and a separate end tube 332 is shown to include notches 324, end tube ridges 326, recess slots 322, rotary tube ridges 316, buttons 320 and spiral slots 318, in accordance with an embodiment of the present invention. To assemble the USB flash drive rotary device, plastic frame 312 is positioned adjacent to end tube 332 so that notches 324 are aligned with recess slots 322. Then plastic frame 312 is pushed inside end tube 332 allowing notches 324 to move inside recess slots 322 until ridges 326 pass ridges 316 to secure end tube 332 to rotary tube 314.

However, rotary tube 314 may still turn relative to end tube 332 which causes the USB plug connector 334 to be deployed or retracted according to CW or CCW rotation of rotary tube 314.

Figure 21:
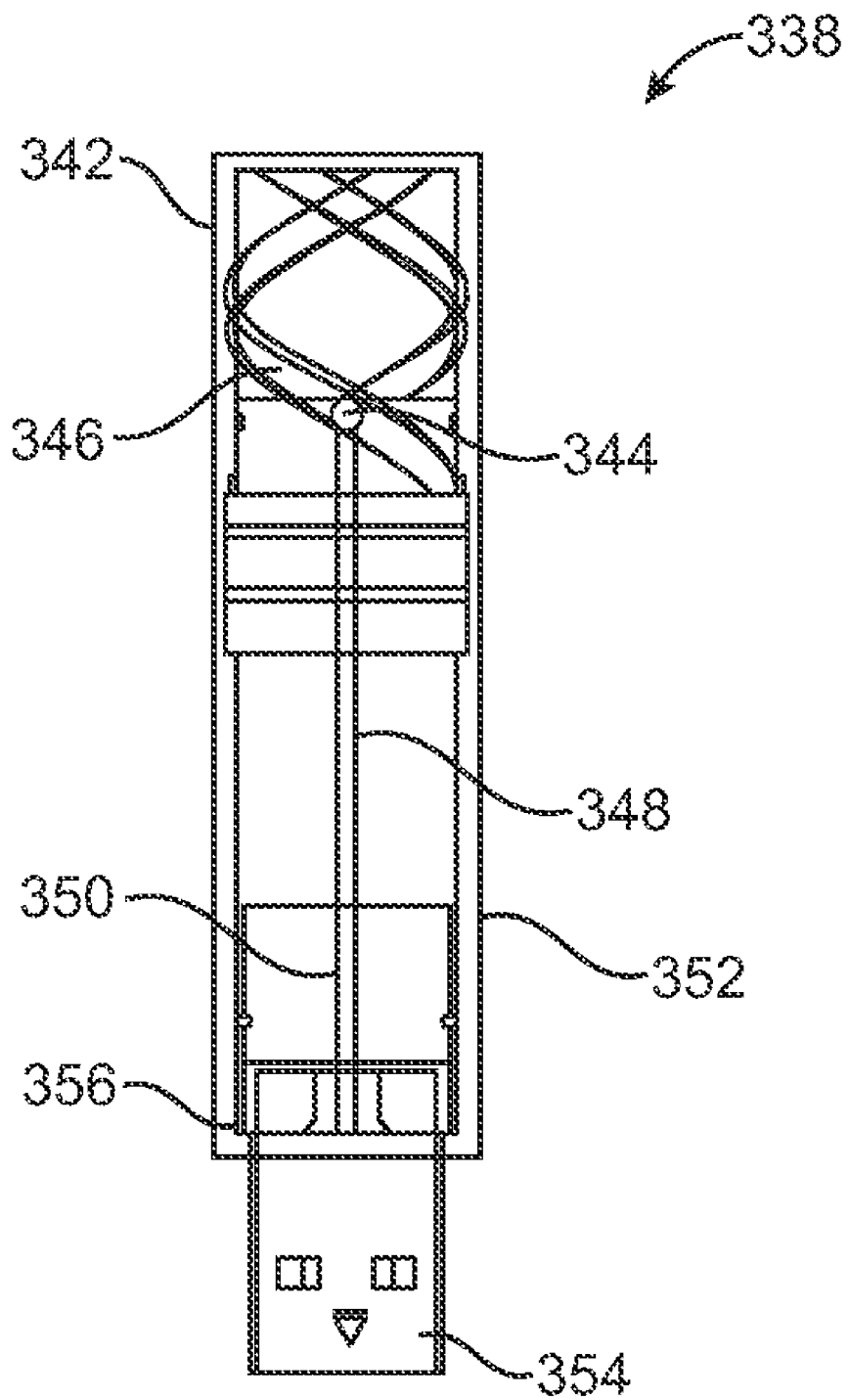

Referring now to FIG. 21, a USB flash drive rotary device 338 in the deployed position is shown to include a rotary tube 342, buttons 344, spiral slots 346, recess slots 348, notches 350, end tube 352 and a USB plug connector 354, in accordance with an embodiment of the present invention.

As rotary tube 342 is turned CW buttons 344 move inside spiral slots 346 to push the USB plug connector 354 out of end tube 352. The USB plug connector is fully deployed when plastic frame edges come in contact with end stop surface 356 of end tube 352 and rotary tube 342 cannot be turned CW any further.

Figure 22:
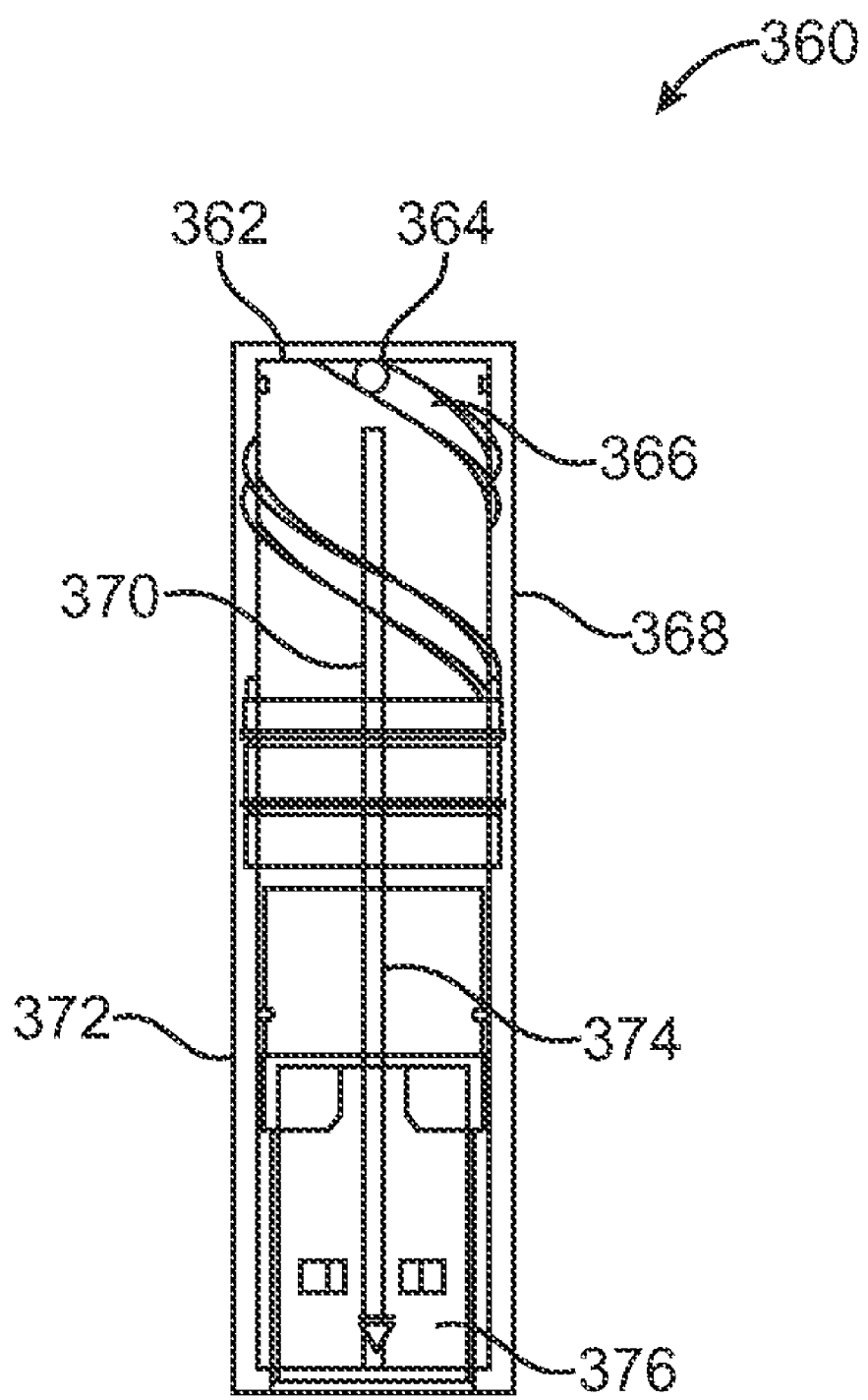

Referring now to FIG. 22, a USB flash drive rotary device 360 is shown in the retracted position to include a rotary tube 368, buttons 364, recess slots 370, spiral slots 366, notches 374, end tube 372 and a USB plug connector 376, in accordance with an embodiment of the present invention.

Rotary tube 368 is turned CCW to cause buttons 364 to move inside spiral slots 366 to retract the USB plug connector 376 inside end tube 372. As the end of the plastic frame comes in contact with the end stop surface 362 of the rotary tube the USB plug connector 376 reaches a fully retracted position so that rotary tube 368 cannot be turned CCW any further. Turning rotary tube 368 CW would redeploy the USB connector 376.

Figure 23A:
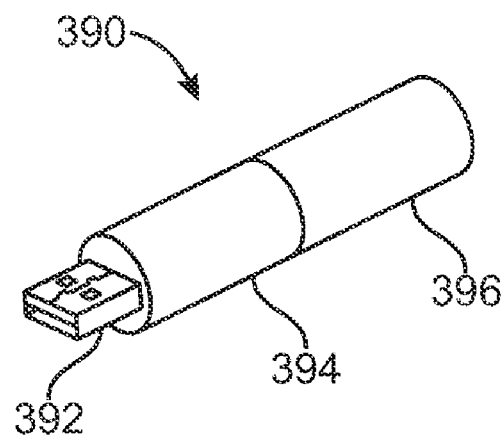

Referring now to FIG. 23(a), an alternative embodiment of a USB flash drive rotary device 390 is shown to include a USB plug connector 392, an end tube 394 and a rotary tube 396, in accordance with an embodiment of the present invention. The USB plug connector 392 may be deployed or retracted back into the end tube 394 by turning the rotary tube 396 CW or CCW relative to end tube 394.

Figure 23B:
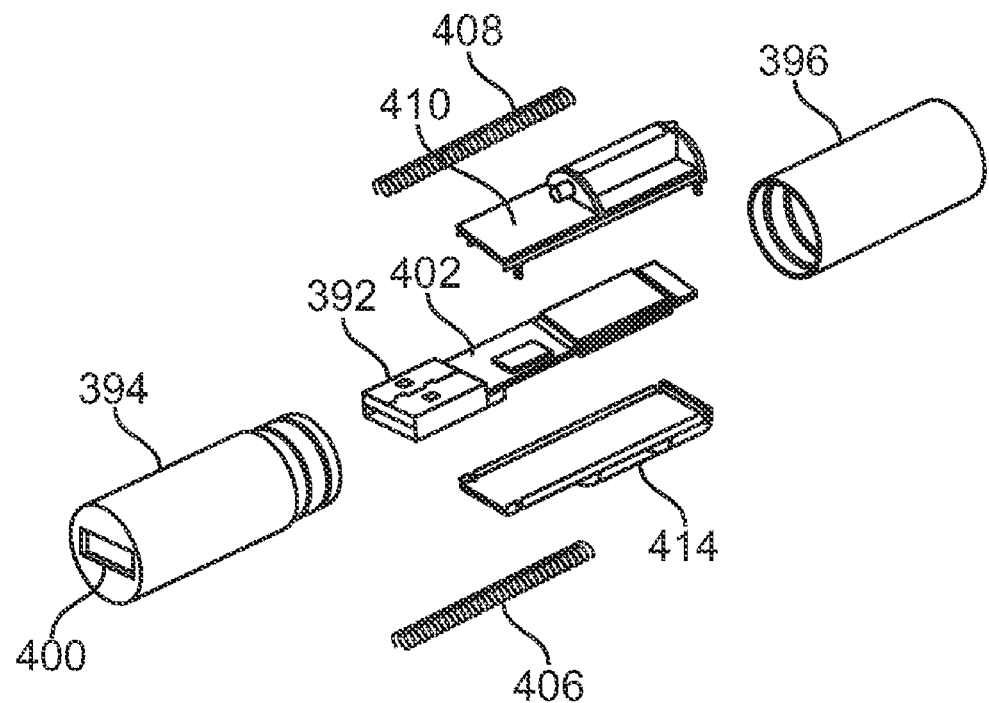

Referring now to FIG. 23(b), a detailed view of the internal components of the USB flash drive rotary tube 390 is shown to include the end tube 394, rotary tube 396, PCB assembly 402, PCB cover 410, PCB holder 414 and two springs 406 and 408, in accordance with an embodiment of the present invention. The PCB assembly 402 includes the USB plug connector 392.

The PCB assembly 402 is positioned inside the PCB holder 414 by being slid therein and the PCB cover 410 is secured onto the PCB holder 414 to form a plastic frame. Thus, PCB assembly 402 is partially enclosed by PCB cover 410 and PCB holder 414. The end of the plastic frame in close proximity to PCB cover 410 is pressed inside rotary tube 396 to be secured therein. The other end of the plastic frame is pressed inside end tube 394 so that the USB plug connector 392 may be deployed or retracted through the cut-out 400 of the end tube 394. In the deployed position the springs 406 and 408 are compressed by the end tube 394 and plastic frame. Turning of rotary tube 396 CCW causes springs 406 and 408 to push the plastic frame into rotary tube 396 thereby retracting the USB plug connector 392. In other embodiments of the present invention one or more springs are installed in the USB flash drive rotary device 10.

Referring now to FIG. 24(a), an outer view of the end tube 420 is shown to include the cut-out 424 and ridges 422, in accordance with an embodiment of the present invention. The USB plug connector is deployed through the cut-out 424.

Referring now to FIG. 24(b), an inner view of the end tube 420 is shown to include slots 426, pins 428 and ridges 422, in accordance with an embodiment of the present invention. PCB cover 410 and PCB holder 414 include bars that move in slots 426 as the plastic frame is pressed inside end tube 394 so that the USB plug connector 392 may protrude out of the cut-out 400 in the deployed position. One end of each of the springs 406 and 408 rests against the pins 428 to be compressed by the plastic frame.

Referring now to FIG. 25, a rotary tube 432 is shown to include ridges 440, two deploying corners 436, two retracting corners 434 and two wedges 438, in accordance with an embodiment of the present invention.

The PCB cover 410 and PCB holder 414 each have a pointer positioned adjacent to the bars. The end of the plastic frame in close proximity to PCB cover 410 is positioned inside rotary tube 432 which is turned to move the pointers in the deploying corners 436. The other end of the plastic frame is pressed into the end tube 420 and springs 408 and 406 are compressed until ridges 422 pass ridges 440 of the rotary tube. End tube 420 is then secured to rotary tube 432.

The springs 406 and 408 while compressed press the pointers firmly into the deploying corners 436 to lock the USB plug connector 392 in the deployed position. Further, pressing the pointers in the deploying corners 436 prevents the rotary tube 432 from turning CW. However, rotary tube 432 may be turned CCW to push the pointers out of the deploying corners 436. As the rotary tube 432 is turned CCW, the pointers move along the wedges 438 into retracting corners 434 the USB plug connector 392 is fully retracted into the end tube 394. The pointers are locked into the retracting corners 434 and rotary tube 432 cannot be turned CCW any further. Turning of rotary tube 432 CW would redeploy the USB plug connector 392.

Figure 26:
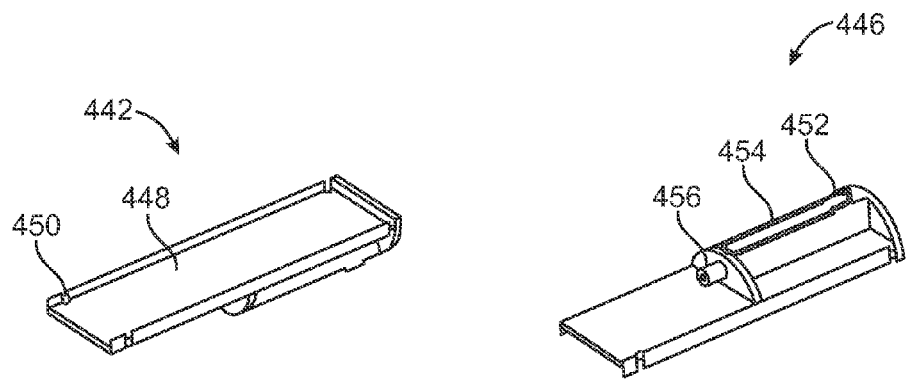

Referring now to FIG. 26, a top view 442 and a bottom view 446 of the PCB holder is shown to include a channel 448, four slots 450, a pointer 452, bar 454 and a pin 456, in accordance with an embodiment of the present invention. PCB assembly 402 is positioned in channel 448 by being slid therein. One end of spring 406 is positioned over the pin 456 to be compressed by the plastic frame in the deployed position. Pointer 452 is pressed by spring 406 in the deploying and retracting corners 436 and 434, respectively, to deploy and retract the USB plug connector. Bar 454 is aligned with slot 426 and moves therein as the plastic frame is pressed inside end tube 420.

Figure 27:
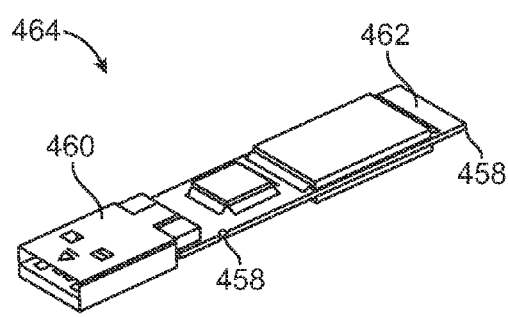

Referring now to FIG. 27, a standard PCB assembly 464 is shown to include a PCB substrate 462, four cut-outs 458 and a USB plug connector 460, in accordance with an embodiment of the present invention. The PCB substrate 462 is coupled to the USB plug connector 460. PCB substrate 462 includes all the hardware devices such as the integrated circuits (IC) and flash memory unit. The cut-outs 458 provide clearance for the tabs of the PCB cover to be snapped into slots 450 of the PCB holder.

In other embodiments of the present invention a USB memory card with a standard PCB assembly and a USB metal plug or a single chip USB memory card is used in place of the standard PCB assembly 464, as described in FIGS. 5 (b) and 5(c) respectively.

Figure 28:
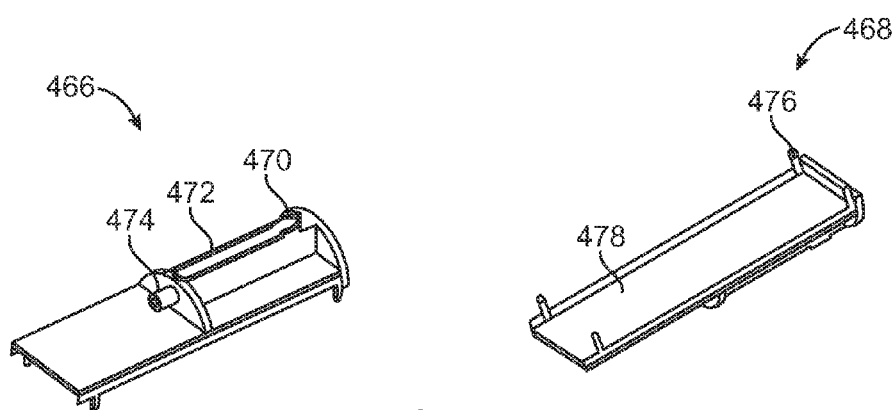

Referring now to FIG. 28, a top view 466 and a bottom view 468 of the PCB cover is shown, in accordance with an embodiment of the present invention. Shown in top view 466 are the pin 474, bar 472 and pointer 470. Shown in the bottom view 468 are the channel 478 and tabs 476.

To assemble the plastic frame channel 478 is positioned on top of the PCB assembly such that the tabs 476 are aligned with the cut-outs 458. Tabs 476 are then pressed into slots 450 of the PCB holder to complete assembly of the plastic frame. The end of the plastic frame in close proximity to the PCB cover and holder is pressed into rotary tube 432. Rotary tube 432 is then turned to move pointers 452 and 470 in the deploying corners 436. Movement of the pointers 452 and 470 along wedges 438 initiated by turning rotary tube 432 CW or CCW causes the USB plug connector 460 to be deployed or retracted.

Figure 29B:
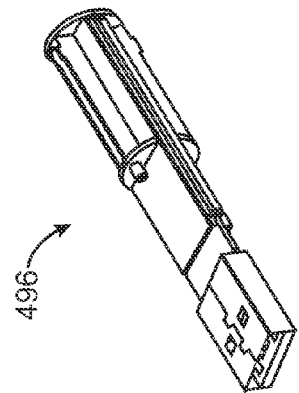
Figure 29A:
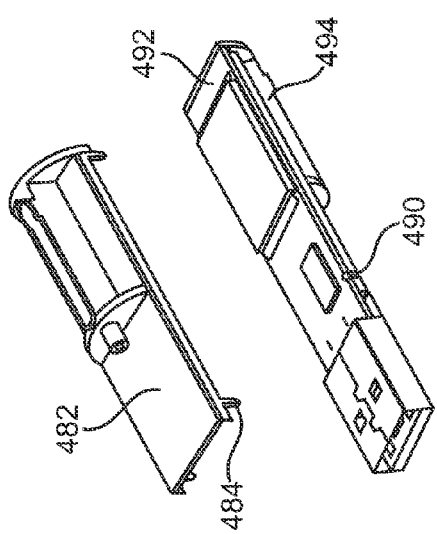

Referring now to FIG. 29(a), a detailed view of internal components of the plastic frame is shown to include a PCB cover 482, PCB assembly 492 and a PCB holder 494, in accordance with an embodiment of the present invention. PCB cover 482 includes tabs 484 and PCB holder 494 includes slots 490. PCB cover 482 is positioned on top of the PCB assembly 492 such that tabs 484 are aligned with PCB cut-outs 458. Tabs 484 are then pressed into slots 490 to complete assembly of the plastic frame.

FIG. 29(b) shows an assembled view of the plastic frame 496, in accordance with an embodiment of the present invention.

Figure 30:
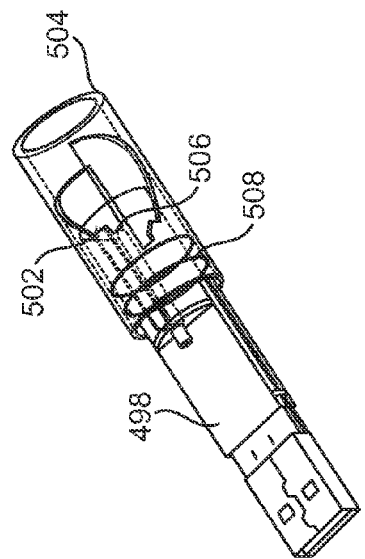

Referring now to FIG. 30, an assembled view of the plastic frame 498 and rotary tube 504 is shown to include pointer 502 and ridges 508, in accordance with an embodiment of the present invention. Plastic frame 498 has been pressed into rotary tube 504 which is turned to position pointer 502 in the deploying corner 506. Movement of pointer 502 along the wedges 438 causes plastic frame 498 and consequently the USB plug connector to move in and out relative to rotary tube 504.

Figure 31:
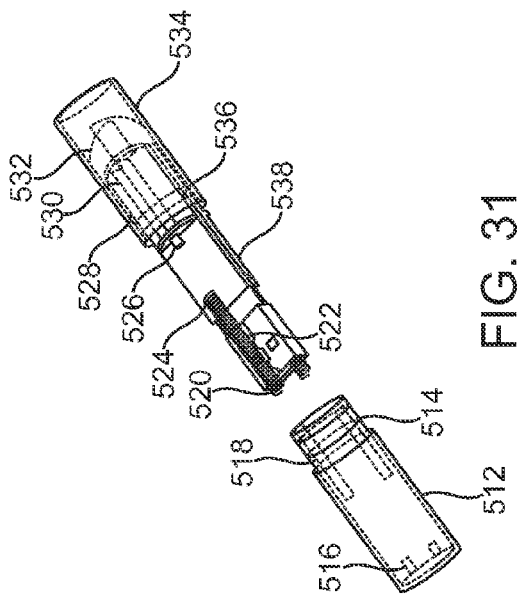

Referring now to FIG. 31, an assembled view of rotary tube 534 and plastic frame 538 and a separate end tube 512 is shown to include pins 516, ridges 514, slots 518, springs 522, pin 526, bars 528, pointers 530, wedges 532 and ridges 536, in accordance with an embodiment of the present invention.

Plastic frame 538 has been positioned inside rotary tube 534 so that pointers 530 are in the deploying corners. To assemble the USB flash drive rotary device the plastic frame 538 is pushed inside the end tube 512 which is positioned adjacent to rotary tube 534. Bars 528 are aligned with slots 518. Springs are positioned inside end tube 512 so that spring end 520 rests against pin 516. The other spring end 524 is positioned adjacent to pin 526 and end tube 512 is pushed inside rotary tube 534 so that bars 528 move inside slots 518 until ridges 514 pass ridges 536 whereby end tube 512 is secured to rotary tube 534. The spring 522 is compressed between pins 516 and 526.

However, rotary tube 534 may still turn relative to end tube 512 which causes the USB plug connector to be deployed or retracted according to the CW or CCW rotation of rotary tube 534.

Figure 32:
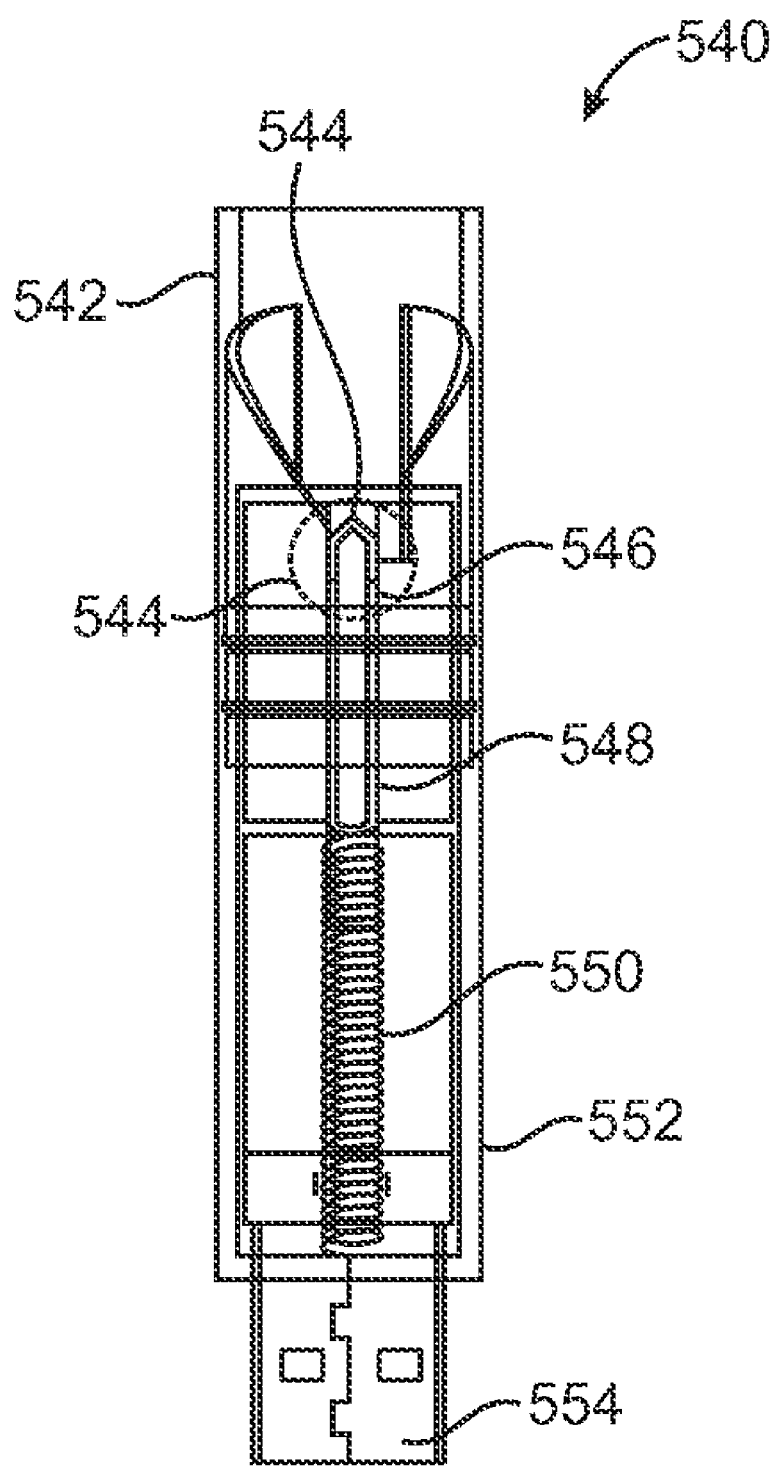

Referring now to FIG. 32, a USB flash drive rotary device 540 in the deployed position is shown to include a rotary tube 542, end tube 552, USB plug connector 554, bars 546, slots 548 and springs 550, in accordance with an embodiment of the present invention. Bars 546 are shown to be at least partially positioned inside slots 548.

As rotary tube 542 is turned CW the pointers move along the wedges to push the USB plug connector 554 out of the end tube 552. As the pointers move into the deploying corners 544 the USB plug connector 554 reaches the deployed position shown in FIG. 32 where the rotary tube 542 cannot be turned CW anymore.

Figure 33:
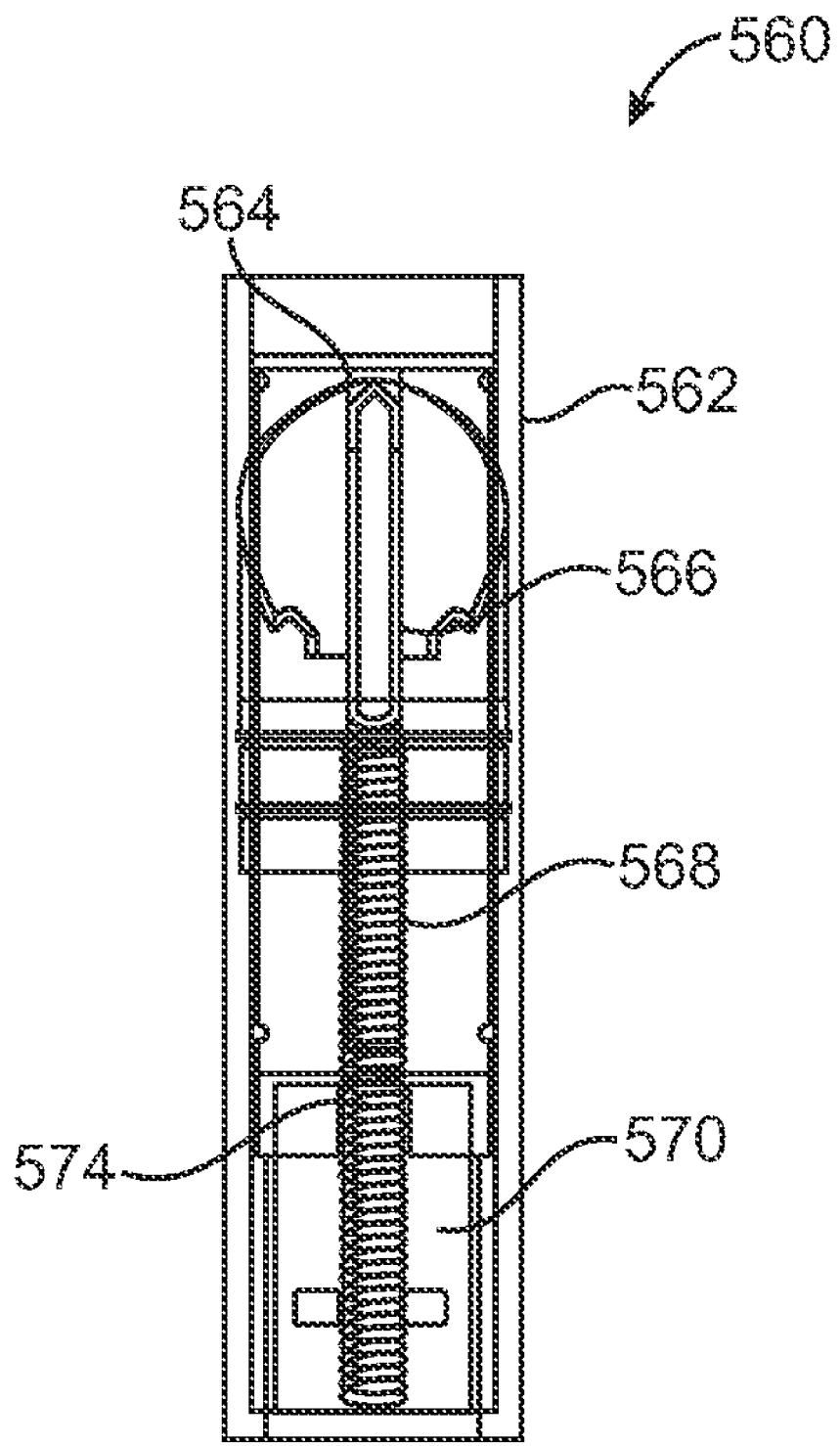

Referring now to FIG. 33, a USB flash drive rotary device 560 in the retracted position is shown to include a rotary tube 562, end tube 572, USB plug connector 570, slots 568, bars 566 and springs 574, in accordance with an embodiment of the present invention.

Rotary tube 562 is turned CCW causing the pointers to move along the wedges to retract the USB plug connector 570 inside end tube 572. As the pointers move into the retracting corners 564, the USB plug connector 570 reaches a fully retracted position shown in FIG. 33 so that rotary tube 562 cannot be turned CCW anymore. Turning of the rotary tube 562 CW would redeploy the USB plug connector 570.

Figure 34A:
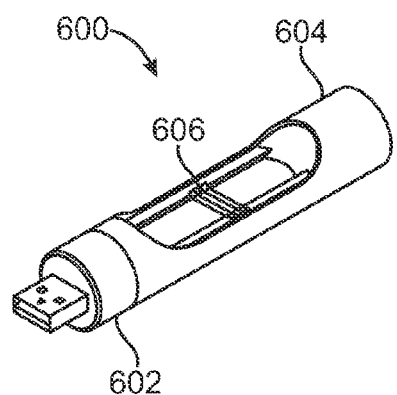

Referring now to FIG. 34(a), a USB flash drive rotary device 600 with a fingerprint sensor 606 is shown to include a rotary tube 604 and an end tube 602, in accordance with an embodiment of the present invention. Fingerprint sensor 606 recognizes individual fingerprints and allows the owner or specific individuals to have access to the information such as data files and images stored in the USB flash drive rotary device 600. Thus, the fingerprint sensor 606 is an additional security feature which protects the sensitive information stored in the USB flash drive rotary device 600 against intrusion.

Figure 34B:
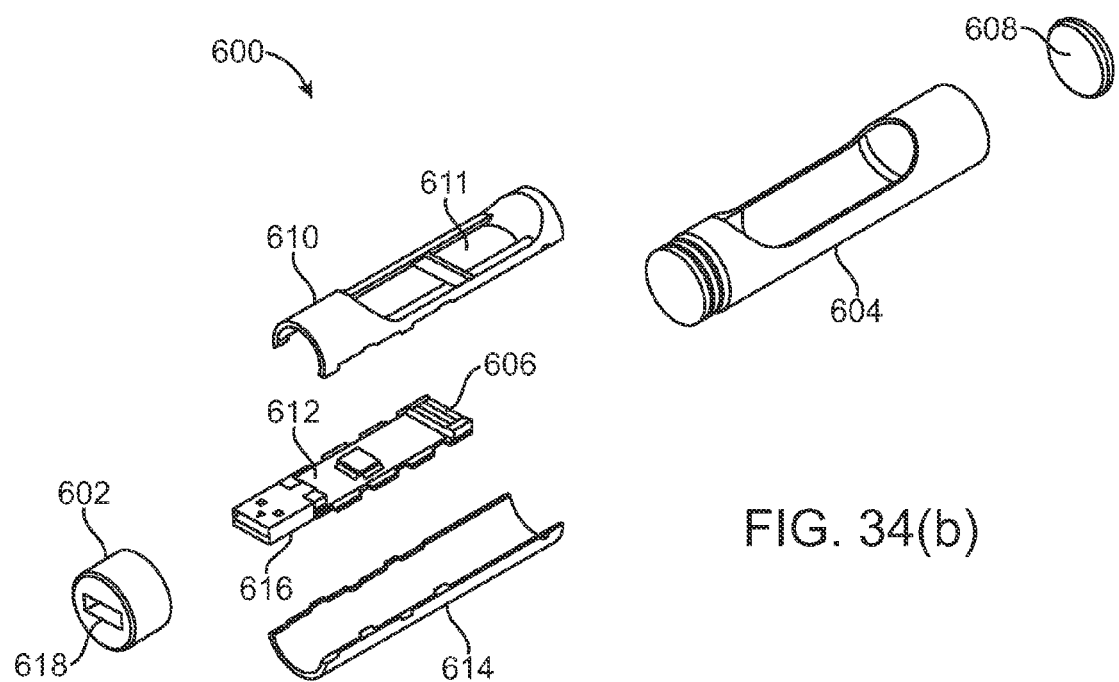

Referring now to FIG. 34(b), internal components of the USB flash drive rotary device 600 are shown to include the end tube 602, PCB cover 610, PCB assembly 612, PCB holder 614, rotary tube 604 and an end button 608, in accordance with an embodiment of the present invention. The PCB assembly 612 includes fingerprint sensor 606 and USB plug connector 616. The PCB cover 610 includes a fingerprint area 611.

The USB plug connector 616 is deployed and retracted by turning the rotary tube 604 CW and CCW, respectively, relative to the end tube 602. Rotary tube 604 has a cut-out clearance through which fingerprint sensor 606 and fingerprint area 611 are accessible to the user in the deployed position shown in FIG. 34(a). Thus, the authorized user by placing a finger on the fingerprint sensor 606 can gain access to the information stored in the USB flash drive rotary device 600.

The PCB assembly 612 is snapped onto the PCB holder 614 and PCB cover 610 is snapped onto the PCB assembly 612 to form a plastic frame. The plastic frame is positioned inside the rotary tube 604 and end button 608 closes one end of the rotary tube 604 by being pressed therein. End tube 602 is pressed onto the other end of the rotary tube 604 such that the USB plug connector 616 may be deployed the end tube cut-out 618 as shown in FIG. 34(a).

Figure 35:
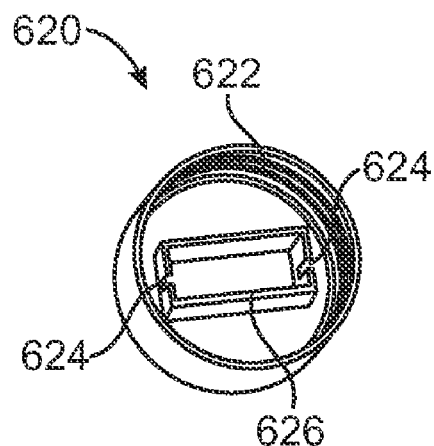

Referring now to FIG. 35, an end tube 620 is shown to include ridges 622, end stop surfaces 624 and end tube cut-out 626, in accordance with an embodiment of the present invention. The two ridges are positioned in the rotary tube 604 to secure the end tube 620 to one end of the rotary tube 604. At the deployed position the end surfaces of the PCB assembly come in contact with the end surfaces 624 of the end tube to prevent the USB plug connector from further deployment through the end tube cut-out 626.

Figure 36:
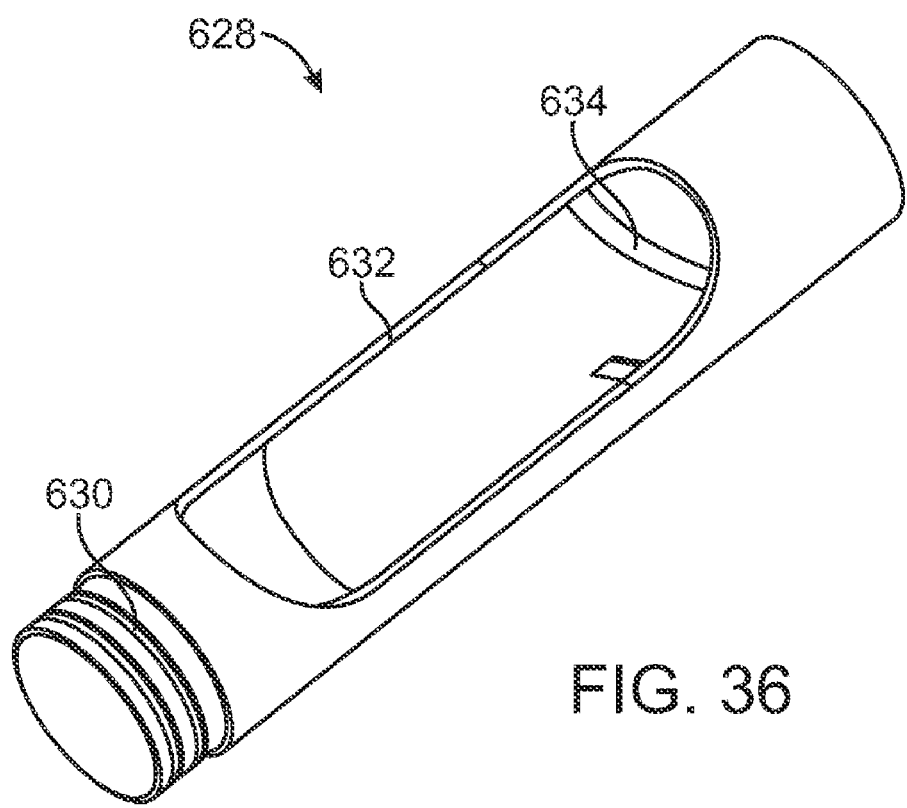

Referring now to FIG. 36, a rotary tube 628 is shown to include grooves 630, cut-out clearance 632 and spiral slots 634, in accordance with an embodiment of the present invention. Ridges 622 snap into the grooves 630 when end tube 620 is pressed into rotary tube 628. Fingerprint area 611 and fingerprint sensor 606 show through the cut-out clearance 632 in the deployed position to be accessible to the user. In the retracted position rotary tube 628 has turned almost half turn or 180 degrees so that the fingerprint area 611 and sensor 606 face away from the cut-out clearance 632 to be hidden inside the rotary tube 628. There are buttons on the plastic frame that move inside spiral slots 634 as the rotary tube 628 is turned to either deploy or retract the USB plug connector.

Figure 37:
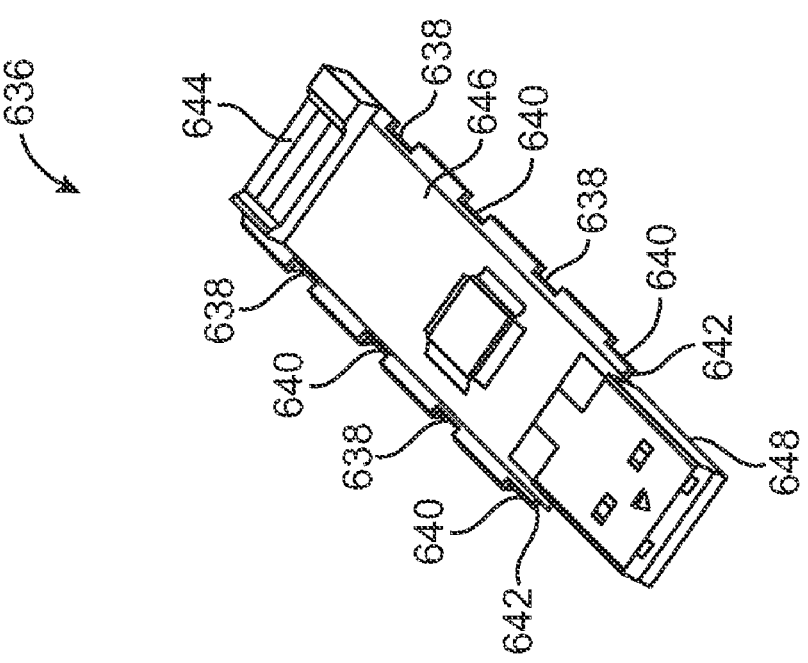

Referring now to FIG. 37, a PCB assembly 636 is shown to include a PCB substrate 646, cut-out clearances 638 for tabs of the PCB holder, cut-out clearances 640 for tabs of the PCB cover, PCB end stop surfaces 642, USB plug connector 648 and fingerprint sensor 644, in accordance with an embodiment to the present invention.

Mounted on the surface of the PCB substrate 646 are electronic devices of a USB flash drive such as the memory unit and controller. PCB end stop surfaces 642 come in contact with end stop surfaces 624 of the end tube when the USB plug connector 648 is in the deployed position. PCB holder 614 includes tabs which are aligned with cut-out clearances 638 to be snapped into the PCB assembly 636. Similarly, PCB cover 610 includes tabs that are aligned with cut-out clearances 640 to be snapped into the PCB assembly 636. Fingerprint sensor 644 is positioned to be aligned with a cut-out on the PCB cover 610.

Figure 38:
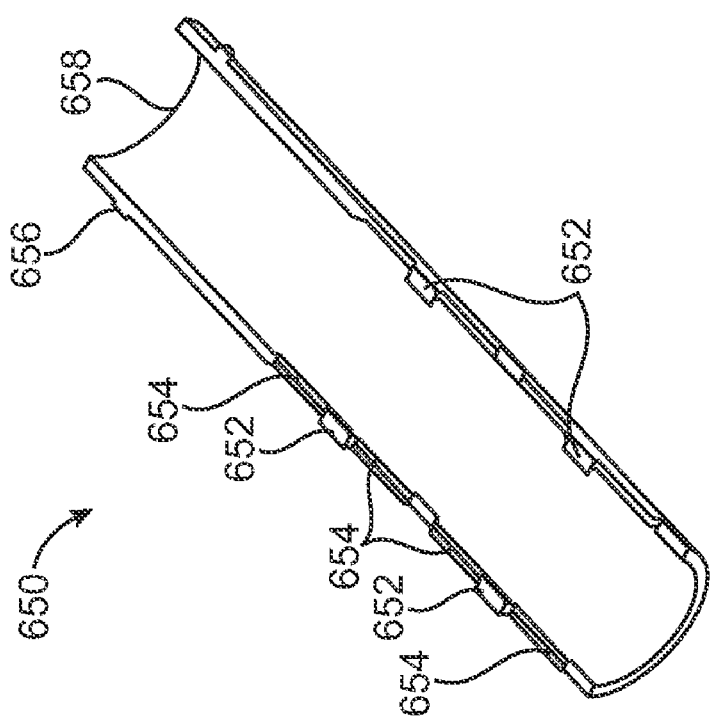

Referring now to FIG. 38, a PCB holder 650 is shown to include tabs 652, buttons 656, PCB holding surfaces 654 and end stop surface 658, In accordance with an embodiment of the present invention. Buttons 656 and similar buttons on the PCB cover move inside spiral slots 634 causing the plastic frame to move in and out relative to rotary tube 36. Movement of the plastic frame out of and into rotary tube 628 causes the USB plug connector to be deployed and retracted, respectively. PCB holding surfaces 654 are surfaces that the edges of the PCB substrate 646 come in contact with when PCB assembly 636 is pressed onto PCB holder 650.

Referring now to FIG. 39, a top view 660 and a bottom view 662 of the PCB cover is shown, in accordance with an embodiment of the present invention. Top view 660 includes a fingerprint area 664 and sensor cut-out 668. Bottom view 662 includes tabs 670, PCB holding surfaces 672, end stop surface 674 and buttons 676.

Fingerprint area 664 shows through cut-out clearance 632 of the rotary tube in the deployed position. Fingerprint sensor 644 is accessible through sensor cut-out 668. The buttons 676 and 656 move in spiral slots 634 causing the plastic frame to move in and out of the rotary tube 628. End stop surface 674 comes in contact with end stop surface of the end button in the retracted position. PCB holding surfaces 672 are surfaces which the edges of the PCB substrate 646 come in contact with when the PCB cover is pressed onto the PCB assembly 636. Tabs 670 snap into the PCB assembly 636 to secure the PCB cover to the PCB assembly 636.

Referring now to FIG. 40, an end button 678 is shown to include a step 680 and end stop surface 682, in accordance with an embodiment of the present invention. Step 682 is for fitting end button 678 tightly into the end of the rotary tube 628 having no grooves. End stop surfaces 674 and 658 of the PCB cover and holder, respectively, come in contact with the end stop surface 682 in the retracted position.

Figure 41:
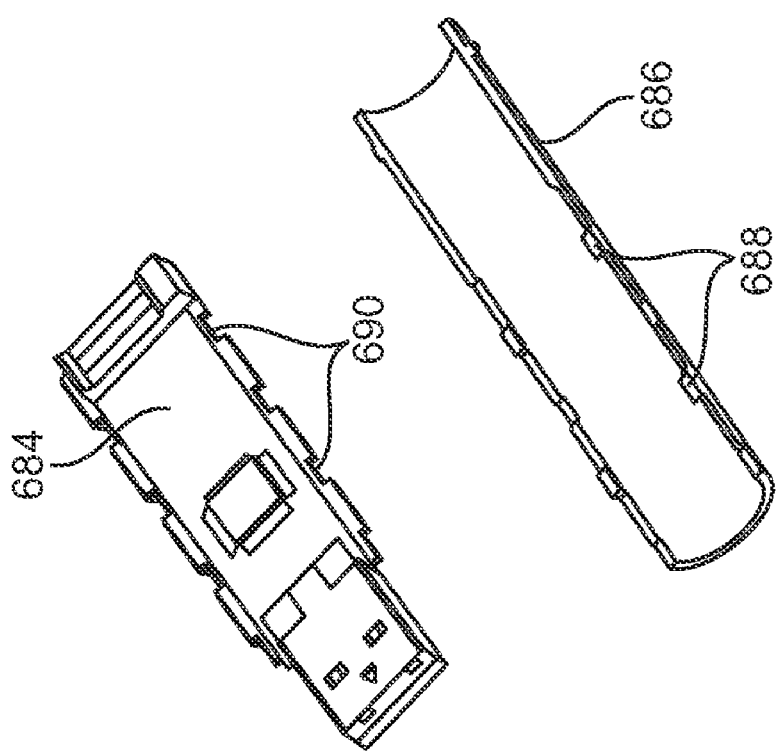
FIG. 41 shows a PCB assembly 684 and a PCB holder 686, in accordance with an embodiment of the present invention.

Referring now to FIG. 41, a PCB assembly 684 and a PCB holder 686 are shown, in accordance with an embodiment of the present invention. PCB assembly 684 includes cut-out clearances 690 and PCB holder includes tabs 688. Initially tabs 688 are aligned with cut-out clearances 690. Then PCB assembly 684 is pressed onto PCB holder 686 until tabs 688 snap into the PCB assembly 684 to form a subassembly.

Figure 42:
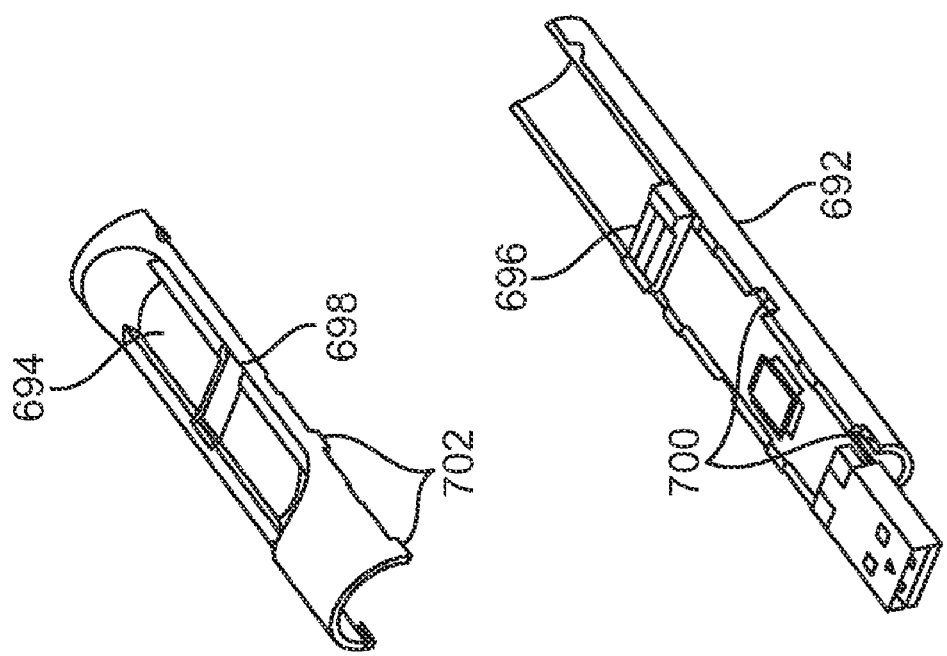
FIG. 42 shows a PCB cover 694 and subassembly 692, in accordance with an embodiment of the present invention.

Referring now to FIG. 42, a PCB cover 694 and subassembly 692 are shown, in accordance with an embodiment of the present invention. PCB cover 694 includes tabs 702 and sensor cut-out 698. Subassembly 692 includes a PCB assembly having a fingerprint sensor 696 and cut-out clearances 700. Initially tabs 702 are aligned with cut-out clearances 700 and sensor cut-out 698 is aligned with fingerprint sensor 696. Then PCB cover 694 is pressed onto subassembly 692 until tabs 702 snap into the PCB assembly of the subassembly 692 to form the plastic frame.

Figure 43:
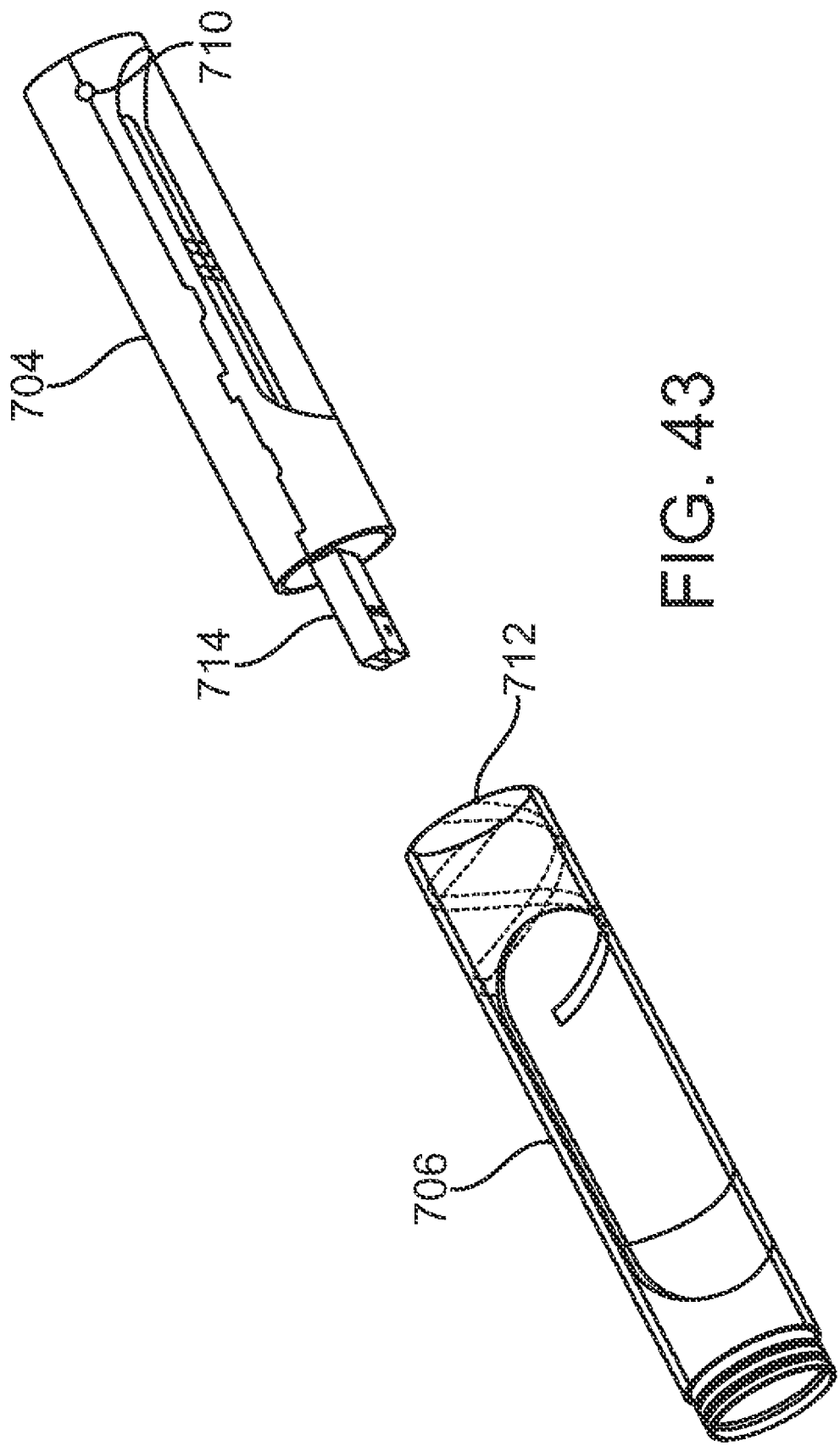
FIG. 43 shows a plastic frame 704 and a rotary tube 706, in accordance with an embodiment of the present invention.

Referring now to FIG. 43, a plastic frame 704 and a rotary tube 706 are shown, in accordance with an embodiment of the present invention. Plastic frame 704 includes buttons 710 and USB plug connector 714 while rotary tube 706 includes spiral slots with opening 712. The end of plastic frame 704 having the USB plug connector 714 is pressed into the end of rotary tube 706 in closer proximity to the spiral slot opening 712 with buttons 710 having been aligned with spiral slot openings 712. Rotary tube 706 is then turned CW causing plastic frame 704 to move therein until the fingerprint area 664 of the PCB cover is aligned with the cut-out clearance 632 of the rotary tube.

Referring now to FIG. 44, a rotary tube 716, an end tube 718 and an end button 720 are shown, in accordance with an embodiment of the present invention. Rotary tube 716 includes grooves 726 and cut-out clearance 728 while end tube 718 includes a cut-out 724. Inserted into the rotary tube 716 is a plastic frame having a USB plug connector 722. Fingerprint area 664 of the PCB cover is aligned with cut-out clearance 728 of the rotary tube.

End tube 718 is pressed onto grooves 726 with the USB plug connector 722 aligned with the cut-out 724. Onto the other end of the rotary tube 716 is pressed the end button 720 to complete assembly of the USB flash drive rotary device.

Referring now to FIG. 45, a USB flash drive rotary device in the deployed position 730 is shown to include fingerprint area 732, rotary tube 734, end tube 736, USB plug connector 740 and PCB end stop surfaces 738, in accordance with an embodiment of the present invention. In the deployed position 730 the plastic frame has moved inside rotary tube 734 so that fingerprint area 732 is almost completely aligned with the cut-out clearance of the rotary tube 734 to be accessed by the used upon demand. In addition, PCB end surfaces 738 are in contact with end stop surface of the end tube 736 to stop rotary tube 734 from turning CW any more and prevent USB plug connector 740 from deploying any further.

Referring now to FIG. 46, a USB flash drive rotary device in the retracted position 742 is shown to include end button 744, rotary tube 750, USB plug connector 752 and end stop surfaces of the PCB cover and holder 746, in accordance with an embodiment of the present invention. In the retracted position 742, rotary tube 750 has turned almost 180 degrees or half turn from the deployed position to turn the fingerprint area 748 almost completely away from the cut-out clearance. Thus fingerprint area 748 is almost completely hidden from view in the retracted position 742.

In addition, PCB cover and holder end stop surfaces 746 are in contact with the end stop surface of end button 744 to stop rotary tube 750 from turning CCW any more and prevent the USB plug connector 752 from retracting any further. Turning the rotary tube 750 CW by almost 180 degrees would re-deploy the USB plug connector 752.

Although the present invention has been described in terms of specific embodiment, it is anticipated that alterations and modifications thereof will no doubt become apparent to those more skilled in the art. It is therefore intended that the following claims be interpreted as covering all such alterations and modification as fall within the true spirit and scope of the invention.

What is claimed is:

1. A universal serial bus (USB) flash drive rotary device comprising:
   a plastic frame including a USB flash drive and a USB plug connector;
   a rotary tube at least partially enclosing said plastic frame for deploying said USB plug connector, said USB flash drive being coupled to said USB plug connector, said rotary tube being turned to retract said USB plug connector, said USB flash drive rotary device for deploying said USB plug connector to couple said USB flash drive to a USB port,
   wherein a PCB cover and a PCB holder include spiral tabs which cause deployment and retraction of the USB plug connector; and
   a plurality of springs, one of which is positioned in the PCB cover and one of which is positioned in the PCB holder for deploying and retracting the USB connector so that the springs, while compressed cause locking of the USB plug connector in a deployed position such that the rotary tube is prevented from turning clockwise, and as the rotary tube is turned counter clockwise, the USB plug connector is fully retracted into the end tube turning the rotary tube clockwise thereby redeploying the USB plug connector.

2. A universal serial bus (USB) flash drive rotary device, as recited in claim 1, wherein the USB flash drive rotary device has a lipstick shape.

3. A universal serial bus (USB) flash drive rotary device, as recited in claim 1, including an end tube rotatably connected to the rotary tube and including a one or more ridges and a cut-out, the ridges positioned to secure the end tube to the rotary tube and the cut-out positioned to allow the USB plug connector to be deployed or retracted.

4. A universal serial bus (USB) flash drive rotary device, as recited in claim 3, wherein the ridges of the rotary tube include a plurality of spiral slots and a rotary tube end stop and wherein the spiral tabs move inside the spiral slots to deploy and retract the USB plug connector by turning the rotary tube in a first direction and the spiral tabs move inside the spiral slots to deploy the USB plug connector out of the end tube and wherein by turning the rotary tube in a second direction, in opposite to the first direction, the spiral tabs move inside the spiral slots to retract the USB plug connector back into the end tube.

5. A universal serial bus (USB) flash drive rotary device, as recited in claim 4, including rotary tube end stop that prevent the plastic frame from moving any further in the rotary tube when the USB plug connector is fully retracted.

6. A universal serial bus (USB) flash drive rotary device, as recited in claim 5, wherein the end tube includes at least one notch disposed therein and wherein the other end of the plastic frame having the USB plug connector being positioned next to the end tube such that the at least one recess slot of the PCB holder is aligned with the notch.

7. A Universal Serial Bus (USB) flash drive rotary device comprising:
   a USB plug connector;
   an end tube housing the USB plug connector when the USB plug connector is deployed therein;
   a rotary tube adapted to rotatably deploy or retract the USB plug connector into and out of the end tube by turning the rotary tube clockwise or counter clockwise;
   a plurality of springs, one of which is positioned in a PCB cover and one of which is positioned in a PCB holder for deploying and retracting the USB connector so that the springs, while compressed cause locking of the USB plug connector in a deployed position wherein the rotary tube is prevented from turning clockwise, and as the rotary tube is turned counter clockwise, the USB plug connector is fully retracted into the end tube turning the rotary tube clockwise redeploying the USB plug connector.

8. A USB flash drive rotary device, as recited in claim 7, further including a Printed Circuit Board (PCB) assembly connected to the PCB plug connector, and wherein the PCB cover and the PCB holder are positioned to house the PCB assembly therebetween.

9. A USB flash drive rotary device, as recited in claim 8, wherein the end tube includes a cut-out through which the USB plug connector is deployed and retracted.

10. A USB flash drive rotary device, as recited in claim 9, wherein the PCB cover includes a button and the PCB holder includes a button and the rotary tube includes spiral slots so that the PCB cover button and the PCB holder button act to move inside the spiral slots to deploy and retract the USB plug connector.

11. A Universal Serial Bus (USB) flash drive rotary device comprising:

a USB plug connector having plastic frame edges;
a rotary tube having and end connected to the USB plug connector and an end stop surface disposed on an end opposite to the USB plug connector;
buttons;
spiral slots;
recess slots;
notches;
an end tube,
wherein as the rotary tube is turned in a clockwise direction, the buttons move inside the spiral slots to push the USB plug connector out of end tube and wherein the USB plug connector is fully deployed when its plastic frame edges come in contact with end stop surface of the end tube and the rotary tube cannot be turned clockwise any further and wherein as the rotary tube is turned counter clock wise to cause the buttons to move inside the spiral slots to retract the USB plug connector inside the end tube so that as the end of the plastic frame comes in contact with the end stop surface of the rotary tube, the USB plug connector reaches a fully retracted position so that the rotary tube cannot be turned in a counter clock wise direction any further and;
a plurality of springs, one of which is positioned in a PCB cover and one of which is positioned in a PCB holder for deploying and retracting the USB connector so that the springs, while compressed cause locking of the USB plug connector in a deployed position wherein the rotary tube is prevented from turning clockwise, and as the rotary tube is turned counter clockwise, the USB plug connector is fully retracted into the end tube turning the rotary tube clockwise redeploying the USB plug connector.

12. A USB flash drive rotary device, as recited in claim 11, further including a PCB assembly connected to the USB connector and positioned inside a PCB holder by being slid therein and further including a PCB cover secured onto the PCB holder to form a plastic frame.

13. A Universal Serial Bus (USB) flash drive rotary device comprising:
   USB connector;
   a PCB assembly connected to the USB connector;
   a printed circuit board (PCB) cover disposed on top of and around the PCB assembly;
   a PCB holder positioned to hold the PCB assembly;
   a rotary tube;
   an end button, wherein the USB plug connector is deployed and retracted by turning the rotary tube clockwise and counter clockwise relative to the end tube;
   a fingerprint sensor including the rotary tube;
   and an end tube, wherein
the fingerprint sensor recognizes individual fingerprints and allows the owner or specific individuals to have access to information stored in the USB flash drive rotary device,
   a plurality of springs, one of which is positioned in the PCB cover and one of which is positioned in the PCB holder for deploying and retracting the USB connector so that the springs, while compressed cause locking of the USB plug connector in a deployed position wherein the rotary tube is prevented from turning clockwise, and as the rotary tube is turned counter clockwise, the USB plug connector is fully retracted into the end tube turning the rotary tube clockwise redeploying the USB plug connector.

* * * * *